(12) United States Patent
Phan et al.

(10) Patent No.: US 11,168,223 B2
(45) Date of Patent: Nov. 9, 2021

(54) PHOTOCHROMIC ARTICLE

(71) Applicant: SDC Technologies, Inc., Irvine, CA (US)

(72) Inventors: Quang Phan, Torrance, CA (US); Erdem Cetin, Irvine, CA (US); Ren-Zhi Jin, Irvine, CA (US); Sapna Blackburn, Mission Viejo, CA (US)

(73) Assignee: SDC TECHNOLOGIES, INC., Irvine, CA (US)

( * ) Notice: Subject to any disclaimer, the term of this patent is extended or adjusted under 35 U.S.C. 154(b) by 129 days.

(21) Appl. No.: 16/142,862

(22) Filed: Sep. 26, 2018

(65) Prior Publication Data

US 2019/0092950 A1 Mar. 28, 2019

Related U.S. Application Data

(60) Provisional application No. 62/564,651, filed on Sep. 28, 2017.

(51) Int. Cl.
*B32B 27/08* (2006.01)
*C09D 5/29* (2006.01)
(Continued)

(52) U.S. Cl.
CPC ............... *C09D 5/29* (2013.01); *C08J 7/042* (2013.01); *C08J 7/043* (2020.01); *C08J 7/046* (2020.01); *C09D 5/002* (2013.01); *C09D 133/06* (2013.01); *C09D 133/24* (2013.01); *C09D 133/26* (2013.01); *C09D 153/00* (2013.01);
(Continued)

(58) Field of Classification Search
CPC ..... G02B 5/23; G02B 1/14; C09K 9/02; C08J 2369/00; C08J 2375/04; C08J 2381/02; C08J 2433/06; C08J 2453/00; C08J 2483/04; C08J 7/042; C08J 7/043; C08J 7/046; C09D 133/06; C09D 133/24; C09D 133/26; C09D 153/00; C09D 183/04; C09D 5/002; C09D 5/29; G03C 1/73; G03C 1/74
See application file for complete search history.

(56) References Cited

U.S. PATENT DOCUMENTS 6,531,076 B2 3/2003 Crano et al.
7,261,843 B2 8/2007 Knox et al.
(Continued)

FOREIGN PATENT DOCUMENTS

CN 102391602 A * 3/2012
EP 1612042 B1 5/2011
(Continued)

OTHER PUBLICATIONS

Office Action and Search Report in Taiwanese Application No. 107134266 dated Sep. 27, 2019.
(Continued)

*Primary Examiner* — Michael B Nelson
(74) *Attorney, Agent, or Firm* — Calfee, Halter & Griswold LLP

(57) ABSTRACT

Disclosed are articles having a thermoplastic photochromic coating. The articles exhibit a Bayer Abrasion ratio of at least 2 and desirable photochromic properties, i.e., the formation of darker activated colors and faster rates of photochromic activation and fade when irradiated with ultraviolet light.

16 Claims, 1 Drawing Sheet

(51) Int. Cl.
*C09D 5/00* (2006.01)
*C09D 153/00* (2006.01)
*C09D 183/04* (2006.01)
*C08J 7/04* (2020.01)
*G02B 1/14* (2015.01)
*G02B 5/23* (2006.01)
*C09D 133/26* (2006.01)
*C09K 9/02* (2006.01)
*G03C 1/74* (2006.01)
*G03C 1/73* (2006.01)
*C09D 133/06* (2006.01)
*C09D 133/24* (2006.01)
*C08J 7/043* (2020.01)
*C08J 7/046* (2020.01)

(52) U.S. Cl.
CPC .............. *C09D 183/04* (2013.01); *C09K 9/02* (2013.01); *G02B 1/14* (2015.01); *G02B 5/23* (2013.01); *G03C 1/73* (2013.01); *G03C 1/74* (2013.01); *C08J 2369/00* (2013.01); *C08J 2375/04* (2013.01); *C08J 2381/02* (2013.01); *C08J 2433/06* (2013.01); *C08J 2453/00* (2013.01); *C08J 2483/04* (2013.01)

(56) References Cited

U.S. PATENT DOCUMENTS

| 7,410,691 | B2 | 8/2008 | Blackburn et al. |
| 9,316,765 | B2 | 4/2016 | Mori et al. |
| 2003/0165686 | A1* | 9/2003 | Blackburn ............... G02B 5/23 |
| | | | 428/412 |
| 2006/0182977 | A1 | 8/2006 | Takenaka et al. |
| 2016/0031134 | A1* | 2/2016 | Cain ................. B29C 45/14065 |
| | | | 264/272.11 |
| 2017/0174983 | A1* | 6/2017 | Odeh ...................... B32B 27/32 |

FOREIGN PATENT DOCUMENTS

| JP | 04-030512 A | 2/1990 |
| JP | H06192651 A | 7/1994 |
| JP | 2009-053533 A | 3/2009 |
| JP | 2013-075929 A | 4/2013 |
| WO | 2006024099 A1 | 3/2006 |

OTHER PUBLICATIONS

International Search Report and Written Opinion from PCT/US2018/053310 dated Feb. 15, 2019.
Office Action in Canadian Patent Application No. 3,049,150 dated Aug. 21, 2020.
Decision of Rejection in Japanese Patent Application No. 2019-555746 dated Sep. 29, 2020.
Thermoplastice vs. Thermosetting Polymers: Properties, Processing and Applications, Matmatch GmbH, https://matmatch.com/learn/material/thermoplastice-vs-thermosetting-polymers, accessed Jul. 17, 2020, pp. 1-6.
Office Action in Japanese Patent Application No. 2019-555746 dated Jul. 15, 2020.

* cited by examiner

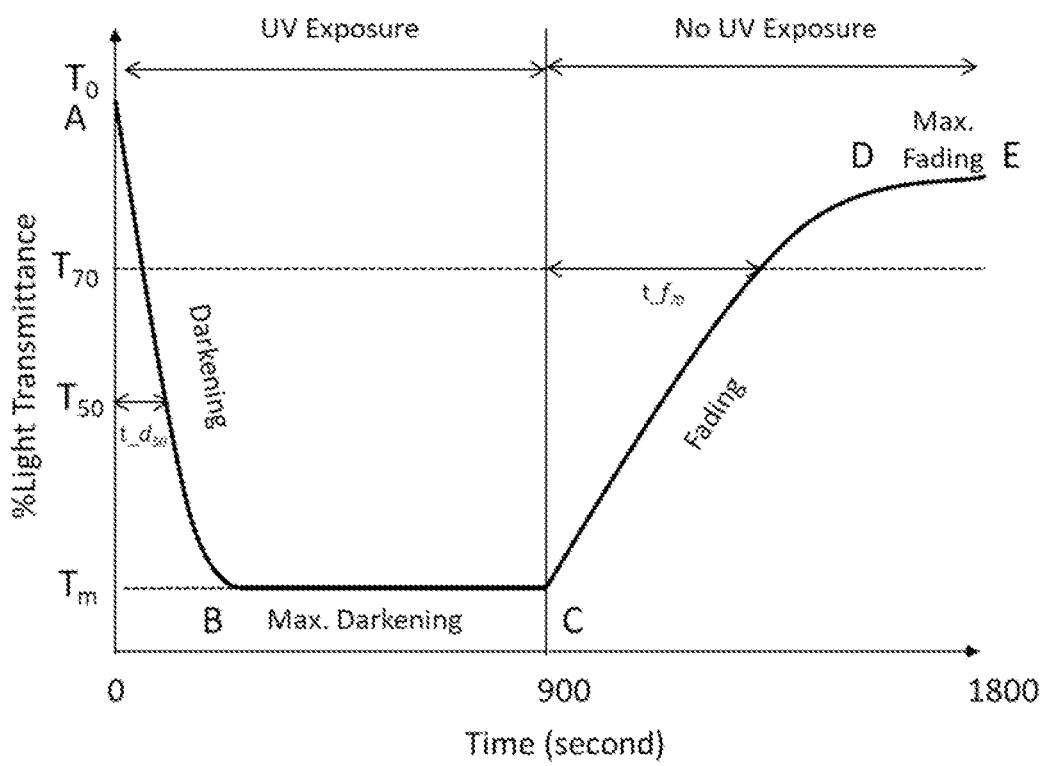

PHOTOCHROMIC ARTICLE

CROSS REFERENCE TO RELATED APPLICATIONS

This application claims priority to and the benefit of U.S. Application No. 62/564,651, filed on Sep. 28, 2017, the entire content of which is incorporated herein by reference.

FIELD OF THE DISCLOSURE

This disclosure relates to articles having a thermoplastic photochromic coating.

BACKGROUND

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer. Photochromic articles that are most useful are those in which the photochromic compounds associated with the article exhibit a high activated intensity, a high coloration rate, and an acceptable fade rate.

The use of photochromic coatings enables the preparation of photochromic plastic articles without the need to incorporate the photochromic compound(s) into the plastic substrate, which avoids the need to develop special optical resin materials for use with photochromic compounds. This is advantageous when the plastic, e.g., thermoplastic polycarbonate, does not have enough internal free volume for a photochromic compound incorporated into the plastic to function properly. The coating composition of the present invention enables preparation of photochromic articles using such plastics. Further, use of photochromic coatings results in more efficient utilization of photochromic compounds by avoiding the losses associated with more conventional transfer methods, e.g., imbibition or permeation, to produce photochromic articles.

Articles containing acrylic photochromic coatings are well documented. However, in order to impart sufficient hardness to the article, these acrylic photochromic compositions are typically cured on to the substrate either via catalytic thermal cure or by photoinitiator-driven radiation cure to yield a cross-linked thermoset photochromic coating layer. Illustrative examples are U.S. Pat. Nos. 6,060,001; 6,602,603; 7,442,734 and 8,012,596. Often photochromic articles need to be reworked during the manufacturing process due to cosmetic or other quality defects. The rework process requires stripping of the photochromic coating with chemicals to revert to the bare substrate followed by reapplication of the photochromic coating. Immersion in harsh caustic solutions at elevated temperatures, generally in combination with ultrasonic cleaning, are typically employed to remove the cross-linked thermoset photochromic layers, which can potentially damage the underlying substrate. Furthermore, the cross-linked nature of these acrylic photochromic coatings limit the total amount of photochromic compounds in the coating to well below 30 percent by weight of the total amount of the monomeric or polymeric resin binder in the coating. See, for example, U.S. Pat. Nos. 7,169,941 and 7,442,734.

Cured photochromic coatings are typically protected from scratches by superposing a curable abrasion resistant coating over them. See, for example, U.S. Pat. Nos. 6,06,001; 6,187,444; 6,268,055; 6,436,525 and 6,506,488. The low concentration of photochromic compound in curable photochromic coating compositions requires the cured photochromic layer to be greater than 15 micrometers in thickness, typically 20 micrometers or higher in thickness, in order to achieve adequate photochromic response. Applying and curing the abrasion resistant coating on such a thick photochromic layer can result in cosmetic defects, and thus necessitate an additional harder "tie-layer" to be interposed between the photochromic coating and the abrasion resistant coating. See, for example, U.S. Pat. Nos. 7,189,456; 7,261,843; and 7,811,480.

SUMMARY

In accordance with the present disclosure, photochromic articles comprising a substrate, a thermoplastic photochromic coating on at least one surface of the substrate, and a protective polymeric hard coating superposed over the photochromic coating are described. Methods for making or preparing the photochromic articles are also disclosed herein.

The thermoplastic photochromic coating layer of the present invention comprises at least 40 parts by weight of photochromic compound(s) per 100 parts by weight of the thermoplastic polymer in the coating. Notably, the photochromic coating imparts sufficient hardness to the photochromic article, and yet is easily removed at room temperature by immersion in or wiping with common alcohol or ketone solvents such as, for instance, propylene glycol methyl ether or methyl ethyl ketone.

The herein described thermoplastic photochromic coatings also demonstrate good photochromic properties, i.e., color and fade at acceptable rates, and achieve a dark enough colored state, and meet optical coating "cosmetic" standards.

In accordance with the present disclosure, an exemplary photochromic article comprises: a substrate, a thermoplastic photochromic coating composition solidified on at least one surface of said substrate, an optional first organic adhesion promoter layer interposed between the substrate and the photochromic coating, a protective polymeric hard coating superposed over the photochromic coating, and an optional second organic adhesion promoter layer interposed between the photochromic coating and the protective hard coating. The thermoplastic photochromic coating composition comprises:

i. a thermoplastic acrylic polymer wherein the polymer or at least one segment of the polymer has a Tg below 55° C.;

ii. a photochromic amount of one or more photochromic compounds; and iii. a non-reactive organic solvent; wherein, the total amount of photochromic compound(s) is at least 40 parts by weight per 100 parts by weight of the total amount of thermoplastic acrylic polymer in the coating composition.

As the photochromic coating comprises a thermoplastic polymer and is itself a thermoplastic coating, the photochromic coating does not cure, so no curing agents or catalysts are needed or are used for the coating. It should be understood that because it does not cure, the thermoplastic polymer does not contain any moieties that have been cross-linked.

As mentioned above, methods of preparing the photochromic article are also disclosed. An exemplary such method comprises: (a) applying and solidifying a thermoplastic photochromic coating composition on at least one surface of a substrate to form a photochromic coating, (b) optionally applying and solidifying a first organic adhesion promoter layer on the at least one surface of the substrate prior to applying the photochromic coating such that the first organic adhesion promoter layer is interposed between the substrate and the photochromic coating; (c) applying and solidifying a protective polymeric hard coating superposed over the photochromic coating; and (d) optionally applying and solidifying a second organic adhesion promoter layer on the photochromic layer prior to applying the protective polymeric hard coating such that the second organic adhesion promoter layer is interposed between the photochromic coating and the protective hard coating. The thermoplastic photochromic coating composition includes:
  i) a thermoplastic acrylic polymer wherein the polymer or at least one polymer segment has a Tg below 55° C.;
  ii) a photochromic amount of one or more photochromic compounds; and
  iii) a non-reactive organic solvent, wherein, the total amount of photochromic compound(s) is at least 40 parts by weight per 100 parts by weight of the total amount of thermoplastic acrylic polymer in the coating composition.

BRIEF DESCRIPTION OF THE DRAWING

The FIGURE shows a schematic of a typical photochromic response output.

DETAILED DESCRIPTION

The invention of the present disclosure relates to photochromic articles comprising thermoplastic photochromic coatings that incorporate at least 40 parts by weight of photochromic compound(s) per 100 parts by weight of the thermoplastic polymer in the coating composition, i.e., the total amount of photochromic compound(s) is at least 40% by weight of the total weight of thermoplastic polymer. In other words, a weight ratio of photochromic compound(s) to thermoplastic polymer is at least 4:10. The thermoplastic photochromic coatings of the present invention comprise thermoplastic acrylic polymers having a glass transition temperature (Tg) of the polymer or at least one segment of the polymer below 55° C. The thermoplastic photochromic polymers of the present invention also contain no cross-linked moieties. The thermoplastic photochromic coatings of the present invention exhibit improved photochromic performance properties when disposed on a substrate and exposed to activating light radiation. The photochromic coatings of the present invention can also easily be stripped with solvent and reworked. In addition, the thermoplastic photochromic coatings of the present invention meet commercially acceptable "cosmetic" standards for optical coatings applied to optical elements, e.g., lenses.

The following description provides exemplary embodiments of the invention disclosed herein. The description of the exemplary embodiments is for illustrative purposes only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements (within or without embodiments) without departing from the spirit and scope of the disclosure as set forth in the appended claims. In other words, unless otherwise indicated herein, such embodiments should not be construed as describing unique or distinct embodiments, but rather embodiments that describe exemplary features which may be used in connection with all embodiments described herein.

In one such exemplary embodiment, an article comprises: a substrate, a thermoplastic photochromic coating composition solidified on at least one surface of said substrate, an optional first organic adhesion promoter layer interposed between the substrate and the photochromic coating, a protective polymeric hard coating superposed over the photochromic coating, and an optional second organic adhesion promoter layer interposed between the photochromic coating and the protective hard coating. The thermoplastic photochromic coating composition comprises:
  i. a thermoplastic acrylic polymer wherein the polymer or at least one segment of the polymer has a Tg below 55° C.;
  ii. a photochromic amount of one or more photochromic compounds; and
  iii. a non-reactive organic solvent; wherein, the total amount of photochromic compound(s) is at least 40 parts by weight per 100 parts by weight of the total amount of thermoplastic acrylic polymer in the coating composition.

As the photochromic coating comprises a thermoplastic polymer and is itself a thermoplastic coating, the photochromic coating does not cure, so no curing agents or catalysts are needed or are used for the coating. As such, the thermoplastic photochromic coating contains no cross-linked (cured) moieties.

Another exemplary embodiment includes methods for preparing the photochromic article of the present invention. An exemplary such method comprises: (a) applying and solidifying a thermoplastic photochromic coating composition on at least one surface of a substrate to form a photochromic coating, (b) optionally applying and solidifying a first organic adhesion promoter layer on the at least one surface of the substrate prior to applying the photochromic coating such that the first organic adhesion promoter layer is interposed between the substrate and the photochromic coating; (c) applying and solidifying a protective polymeric hard coating superposed over the photochromic coating; and (d) optionally applying and solidifying a second organic adhesion promoter layer on the photochromic layer prior to applying the protective polymeric hard coating such that the second organic adhesion promoter layer is interposed between the photochromic coating and the protective hard coating. The thermoplastic photochromic coating composition includes:
  i) a thermoplastic acrylic polymer wherein the polymer or at least one polymer segment has a Tg below 55° C.;
  ii) a photochromic amount of one or more photochromic compounds; and
  iii) a non-reactive organic solvent, wherein, the total amount of photochromic compound(s) is at least 40 parts by weight per 100 parts by weight of the total amount of thermoplastic acrylic polymer in the coating composition.

Because the photochromic coatings of the present invention are thermoplastic, as mentioned above, no curing agents or catalysts (which are useful for thermoset polymers) are used to form the photochromic coatings. Thus, the thermoplastic photochromic coating contains no cross-linked (cured) moieties.

Photochromic Coating

The thermoplastic photochromic coating composition of the present invention includes:

a) from 5 to 65% by weight of a thermoplastic acrylic polymer, including 7 to 55%, and including 10 to 25% by weight of a thermoplastic acrylic polymer, wherein in the polymer or at least one segment of the polymer has a Tg below 55° C.;

b) a photochromic amount of one or more photochromic components; and c) from 5 to 90% by weight of one or more organic solvents, including 15 to 85%, and including 25 to 75% by weight of one or more organic solvents.

Suitable thermoplastic acrylic polymers are poly(alkyl acrylates), poly (alkyl methacrylates) and copolymers of these, wherein the alkyl groups are selected from the group of C1 to C5 alkyls such that the polymer or at least one polymeric segment has a Tg below 55° C. and no cross-linked moieties. Examples of suitable acrylic polymers are PARALOID B44, B48N, B56, B66, B72, B82 series polymers from Dow Chemical, ELVACITE 2044, 2046, 2550, 2927 acrylic polymers from Lucite International, BR and MB series acrylic polymers from Dianal, NANOSTRENGTH acrylic block copolymers from Arkema, and the functionalized diblock and triblock poly(methyl methacrylate) and poly(methyl acrylate) copolymers described in U.S. Pat. Nos. 7,767,757 and 8,492,482.

Preferred thermoplastic acrylic polymers are random, gradient, and block copolymers of acrylic monomers selected from the group comprising C1-C4 alkyl acrylates and alkyl methacrylates. More preferred thermoplastic acrylic polymers are ABA triblock copolymers wherein A and B are two different polymer segments selected from the group comprising poly(methyl acrylate), poly(methyl methacrylate), poly(butyl acrylate), poly(methyl acrylate-co-dialkylacrylamide), poly(methyl methacrylate-co-dialkyl acryl amide), poly(butyl acrylate-co-dialkylacrylamide). Particularly preferred are ABA triblock copolymers wherein A is poly(methyl methacrylate-co-dialkylacrylamide) and B is poly(butyl acrylate). The dialkylacrylamide is preferably present in the A segment of ABA triblock acrylic copolymer from 1 to 40 mole percent, most preferably from 5 to 30 mole percent. The dialklyacrylamide is preferably N,N-dimethylacrylamide.

Organic solvents utilized in the coating composition are those that dissolve the solid components and provide sufficient dilution for ease of application to the substrate, without chemically combining with or reacting with the coating components, and can easily be removed after coating application by air drying, vacuum drying or heating. The minimum amount of solvent present in the coating composition is a solvating amount, i.e., an amount which is sufficient to solubilize the solid components in the coating composition. Suitable types of solvents include, but are not limited to, aliphatic alcohols, alcohol ethers, alcohol esters, ketones, and alcohol ketones. Specific examples of such solvents include, but are not limited to, the following: benzene, toluene, methyl ethyl ketone, methyl isobutyl ketone, acetone, ethanol, tetrahydrofurfuryl alcohol, propyl alcohol, diacetone alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N—(N-octyl)pyrrolidinone, N—(N-dodecyl)pyrrolidinone, 2-methoxyethyl ether, xylene, cyclohexane, 3-methyl cyclohexanone, ethyl acetate, butyl acetate, propyl acetate, propylene glycol monomethyl ether acetate (PM acetate), tetrahydrofuran, methanol, amyl propionate, methyl propionate, propylene glycol methyl ether, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Dow Chemical, and mixtures of such solvents.

Photochromic components utilized in the photochromic coating composition(s) of the present invention are organic photochromic compounds. Such compounds may be used individually or in combination with other complementary photochromic compounds. Organic photochromic compounds or substances containing same used in the coating compositions described herein have at least one activated absorption maximum within the range of between 380 and 780 nanometer; and may be incorporated, e.g., dissolved or dispersed, in the coating composition, and color when activated to an appropriate hue.

Examples of suitable photochromic compounds for use in the photochromic coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline) pyridobenzoxazines and indeno-fused naphthopyrans such as those disclosed in U.S. Pat. Nos. 5,645,767; 5,658,501, and their polymeric derivatives such as those disclosed in U.S. Pat. Nos. 7,247,262 and 9,217,812. Other photochromic substances contemplated for use herein are photochromic metal-dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38, and mixtures of the aforementioned suitable photochromic substances.

The photochromic coatings of the present invention comprise one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767, column 12, line 66 to column 13, line 19.

The amount of the photochromic substances described herein to be used in the coating of the present invention is an amount sufficient to produce a photochromic effect discernible to the naked eye upon activation. Unless otherwise disclosed herein, such amount is referred to as a photochromic amount.

The relative amounts of the aforesaid photochromic compounds used will vary and depend in part upon the relative intensities of the color of the activated species of such compounds, and the ultimate color desired. Generally, the amount of photochromic compound(s) incorporated into the coating composition will range from 2 to 30 weight percent, and most preferably, from 5 to 15 weight percent. Notably, the photochromic coating compositions incorporate at least 40 parts by weight of photochromic compound(s) per 100 parts by weight of the thermoplastic polymer in the coating composition, i.e., the total amount of photochromic compound(s) is at least 40% by weight, including at least 50%, including from 40-70%, including 50-70%, including 40-60%, including 50-60%, and including 60-70% by weight of the total weight of thermoplastic acrylic polymer. In other words, a weight ratio of photochromic compound(s) to thermoplastic polymer is at least 4:10, including at least 5:10, including from 4:10 to 7:10, including from 4:10 to 6:10, including from 5:10 to 6:10, and including from 6:10 to 7:10.

The photochromic compound(s) described herein are incorporated into the coating composition by adding the photochromic component(s) directly to the coating composition and/or by dissolving in solvent before adding the solvent to the coating composition.

Compatible (chemically and color-wise) tints, i.e., dyes, may be added to the coating composition, applied to the coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substance is in an unactivated state.

Optional ingredients that may be included in the coating composition, include, but are not limited to, light stabilizers, ultraviolet light absorbers, antioxidants, surfactants, leveling agents, and tint additives.

Additional materials may be incorporated into the coating composition with the photochromic substances, prior to, simultaneously with or subsequent to application or incorporation of the photochromic substances in the coating composition or solidified coating. For example, ultraviolet light absorbers such as benzotriazoles, benzophenones, hydroxyphenyl triazines may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), antioxidants, e.g., polyphenolic antioxidants, secondary aromatic amines, asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356, 5,391,327 and 5,770,115. Examples of suitable UV absorbers that may be used in the coating compositions include, but are not limited to, 2-hydroxy-benzophenones (BPs) (commercial examples include CHIMASSORB 81 and CHIMASSORB 90, both available from BASF of Germany); 2-(2-hydroxyphenyl)-benzotriazoles (HPBTs) (commercial examples include TINUVIN 1130, TINUVIN 384-2, TINUVIN 928, and TINUVIN 900 (all from BASF); and 2-hydroxyphenyl-s-triazines (HPTs) (commercial examples include, but are not limited to, TINUVIN 400, TINUVIN 405 (both from BASF). Examples of suitable HALS that may be used in the coating compositions include, but are not limited to, 2,2,6,6-tetramethyl piperidine and its derivatives (commercial examples include TINUVIN144, TINUVUN123, TINUVIN 152, TINUVIN 292, all from BASF).

Surfactants and leveling agents may be added to the coating composition. Some exemplary surfactants and leveling agents are polyethers (commercially available as TRITON X-100, X-405, and N-57 from Dow Chemical of Midland, Mich.), silicones (commercially available as PAINT ADDITIVE 3, PAINT ADDITIVE 29, PAINT ADDITIVE 57, FZ-77, FZ-2123, and FZ-7604 from Dow Corning of Midland, Mich.; BYK333, BYK377, BYK306 from BYK-Chemie GmbH, Germany; and COATOSIL 77 and COATOSIL 7600 from Momentive of Columbus, Ohio), fluorosurfactants (commercially available as FLUORAD FC-4430 from 3M Corporation of St. Paul, Minn.), fluorosilicones, polyacrylates, silicone polyacrylates such as silicone hexaacrylate, and fluoro-modified polyacrylates.

The photochromic coating compositions of the present invention are applied to substrates variously by spray coating, spin coating, flow coating, spread coating, curtain coating, dip coating, casting, or roll-coating, and other common coating techniques including conventional printing techniques, such as flexographic, lithographic, digital and screen printing. Following application, the coating composition is desolvated, i.e., solidified, to a sufficient degree to form a solid, tack-free layer. The desolvation can be achieved by ambient air drying, ambient forced air drying, vacuum drying, infrared (IR) heating between 50° C. to 100° C., convection oven heating between 40° C. to 120° C., or a combination of the above.

The desolvated coating meets commercially acceptable "cosmetic" standards for optical coatings. Examples of cosmetic defects of coated lens include pits, spots, inclusions, cracks and crazing of the coating. The coatings prepared using the photochromic coating composition of the present invention are substantially free of cosmetic defects. Unless indicated herein, "substantially free of cosmetic defects" means at least 90% of the visible surface area of the coated lens, circumscribed from the geometric center of the coated lens surface, is free from cosmetic defects.

The amount of the coating composition applied to at least one surface of the substrate is an amount necessary to incorporate a sufficient quantity of the organic photochromic substance(s) to produce a coating that exhibits the required change in light transmittance when the cured coating is exposed to UV radiation. The required change in light transmittance is at least 50% within 60 seconds, preferably within 30 seconds, of exposure to sunlight or light source simulating solar UV spectrum, when tested at ambient temperature of 20° C. to 25° C. The fading time (t_f70) of the photochromic coating (i.e., the photochromic(s) in the coating) should be 300 seconds or less, preferably 200 seconds or less, using the photochromic response testing described in Section A.8. herein. The applied coating has a nominal thickness within a range of from 3 to 20 micrometers, more preferably, from 3 to 15 micrometers, most preferably from 3 to 10 micrometers.

Substrate

The coating compositions of the present invention are applied to substrates, of any type such as, for example paper, glass, ceramics, wood, masonry, textiles, metals and polymeric organic materials. Preferably, the substrate is an optically clear polymeric organic material, particularly, thermoset or thermoplastic polymeric organic materials, e.g., thermoplastic polycarbonate type polymers and copolymers and homopolymers or copolymers of a polyol(allyl carbonate) used as organic optical materials. Examples of polymeric organic materials that may be substrates for the coating composition of the present invention are polymers, i.e., homopolymers and copolymers, of the monomers and mixtures of monomers disclosed in U.S. Pat. No. 5,658,501 from column 15, line 28 to column 16, line 17.

Examples of such monomers and polymers include: polyol(allyl carbonate) monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked polymer derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof. Such optically clear polymers may have a refractive index that may range from about 1.48 to about 1.80, including from about 1.495 to about 1.74.

Polymeric substrates such as, for instance, plastic optical lenses, are sometimes supplied with a protective factory hard coat applied by the manufacturer. Such factory-coated substrates are also included in the substrates applicable to the present invention.

It is typical to treat the surface of the substrate to be coated prior to applying the coating composition of the present invention for the purposes of cleaning the surface and promoting adhesion. Effective treatment techniques for plastics, such as those prepared from CR-39 diethylene glycol bis(allyl carbonate) monomer or thermoplastic polycarbonate, e.g., a polymer derived from bisphenol A and phosgene, include ultrasonic cleaning; washing or wiping with an organic solvent, e.g. isopropanol, ethanol, PM glycol ether, propylene glycol n-propyl ether or their mixtures; washing with an aqueous mixture of organic solvent, e.g., a 50:50 mixture of isopropanol:water or ethanol:water; UV treatment; activated gas treatment, e.g., treatment with low temperature plasma or corona discharge, chemical treatment such as hydroxylation, i.e., etching of the surface with an aqueous solution of alkali, e.g., sodium hydroxide or potassium hydroxide, that may also contain a surfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials; and organosilane treatments, for example, see U.S. Pat. Nos. 3,391,053, 4,268,134, 4,615,947, 4,679,918, and U.S. Pat. Appln. No. 2008/0095933A1.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

Protective Polymeric Hard Coating

The protective polymeric hard coating superposed on the photochromic coating of the invention are heat (thermally) curable polymer-forming organosilane coatings, such as for instance, thermally curable CRYSTALCOAT MP, CC and TC series coatings available from SDC Technologies, Inc., or radiation curable hard coatings such as, for instance, CRYSTALCOAT UV series coatings available from SDC Technologies, Inc., which after cure shall provide acceptable cosmetics and scratch/abrasion resistance to the photochromic article. For instance, preferably, a protective polymeric hard coating for a photochromic eyewear lens of the protective polymeric hard coating provides sufficient abrasion resistance to the lens to achieve a Bayer Abrasion Ratio (B.R.) of at least 2, preferably at least 3, most preferably a B.R. greater than 3.5. Preferably, the photochromic article of the protective polymeric hard coating meets commercially acceptable cosmetic standards for optical coatings. Examples of cosmetic defects of coated lens include pits, spots, inclusions, flow lines, cracks, and crazing of the coating. Most preferably, the article of the protective polymeric hard coating is substantially free of cosmetic defects.

Some examples of such suitable protective polymeric hard coatings are detailed in U.S. Pat. Nos. 5,958,514, 6,001,163, 6,342,097, 6,346,331, 6,348,269, 6,538,093, 7,001,642, 7,014,918, 7,018,463, 7,097,704, 7,105,598. The protective polymeric hard coatings are prepared from compositions comprising:

1) from about 10 to about 99.9 weight percent of an aqueous-organic solvent mixture comprising, based on the total solids of the composition, of a mixture of hydrolysis products and partial condensates of an epoxy functional silane and a tetrafunctional silane, where the epoxy functional silane and the tetrafunctional silane are present in the aqueous-organic solvent mixture in a molar ratio of from about 0.1:1 to about 5:1; and 2) from about 0.1 to about 30 weight percent, based on the total solids of the composition, of a multifunctional compound selected from the group consisting of multifunctional carboxylic acids, multifunctional anhydrides and combinations thereof.

The coating compositions may further include from about 0.1 to about 50 weight percent of a mixture of hydrolysis products and partial condensates of one or more monofunctional, difunctional, and/or trifunctional silanes, based on the total solids of the composition, and/or an amount of colloidal silica or a metal oxide or combinations thereof equivalent to from about 0.1 to about 50 weight percent, based on the total solids of the composition.

The coating compositions may also further include from 0.1 to about 15 weight percent of a suitable additives, such as blocked isocyanates, polyol adhesion promoters, tint additives, stabilizers, flow modifiers, etc. based on the total solids of the composition. When the protective polymeric hard coatings are UV curable, the coating compositions shall include from 0.5 to about 10 weight percent of suitable radiation curable initiators, based on the total solids of the composition.

While the presence of water in the aqueous-organic solvent mixture is necessary to form hydrolysis products of the silane components of the mixture, the actual amount can vary widely. Essentially enough water is needed to provide a substantially homogeneous coating mixture of hydrolysis products and partial condensates of the epoxy functional silane and the tetrafunctional silane which, when applied and cured on an article, provides a substantially transparent protective polymeric hard coating.

The solvent constituent of the aqueous-organic solvent mixture of the coating compositions of the protective polymeric hard coating can be any solvent or combination of solvents which is compatible with the epoxy functional silane, the tetrafunctional silane and the multi-functional component. For example, the solvent constituent of the aqueous-organic solvent mixture may be an alcohol, an ether, a glycol or a glycol ether, a ketone, an ester, a glycol ether acetate and mixtures thereof. Suitable alcohols can be represented by the formula ROH where R is an alkyl group containing from 1 to about 10 carbon atoms. Some examples of alcohols useful in the application of this invention include methanol, ethanol, propanol, isopropanol, butanol, isobutanol, secondary butanol, tertiary butanol, cyclohexanol, pentanol, octanol, decanol, and mixtures thereof.

Suitable ethers, glycols, and glycol ethers can be represented by the formula $R_1—(OR_2)_x—OR'$ where x is 0, 1, 2, 3, or 4, $R_1$ is hydrogen or an alkyl group containing from 1 to about 10 carbon atoms and $R_2$ is an alkylene group containing from 1 to about 10 carbon atoms and combinations thereof. Examples of suitable ethers, glycols, and glycol ethers having the above-defined formula and which may be used as the solvent constituent of the aqueous-organic solvent mixture of the coating compositions of the protective polymeric hard coating include di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, and mixtures thereof. In addition to the above, cyclic ethers such as tetrahydrofuran and dioxane are suitable ethers for the aqueous-organic solvent mixture.

Examples of ketones suitable for the aqueous-organic solvent mixture include acetone, diacetone alcohol, methyl ethyl ketone, cyclohexanone, methyl isobutyl ketone, and mixtures thereof.

Examples of esters suitable for the aqueous-organic solvent mixture include ethyl acetate, n-propyl acetate, n-butyl acetate, and combinations thereof.

Examples of glycol ether acetates suitable for the aqueous-organic solvent mixture include propylene glycol methyl ether acetate, dipropylene glycol methyl ether acetate, ethyl 3-ethoxypropionate, ethylene glycol ethyl ether acetate, and combinations thereof.

The epoxy functional silane used in the formulation of the coating compositions of the protective polymeric hard coating can be any epoxy functional silane which is compatible with the tetrafunctional silane and the multifunctional component of the coating composition and which provides a coating composition which, upon curing produces a substantially transparent, abrasion resistant protective polymeric hard coating.

Generally, such epoxy functional silanes are represented by the formula $R_3xSi(OR_4)_{4-x}$ where x is an integer of 1, 2 or 3, $R_3$ is H, an alkyl group, a functionalized alkyl group, an alkylene group, an aryl group, an alkyl ether, and combinations thereof containing from 1 to about 10 carbon atoms and having at least 1 epoxy functional group, and $R_4$ is H, an alkyl group containing from 1 to about 5 carbon atoms, an acetyl group, a $—Si(OR_5)_{3-y}R_{6y}$ group, where y is an integer of 0, 1, 2, or 3, and combinations thereof where $R_5$ is H, an alkyl group containing from 1 to about 5 carbon atoms, an acetyl group, or another $—Si(OR_5)_{3-y}R_{6y}$ group and combinations thereof, and $R_6$ is H, an alkyl group, a functionalized alkyl group, an alkylene group, an aryl group, an alkyl ether, and combinations thereof containing from 1 to about 10 carbon atoms which may also contain an epoxy functional group.

Examples of such suitable epoxy functional silanes include glycidoxymethyltrimethoxysilane, 3-glycidoxypropyltrihydroxysilane, 3-glycidoxypropyldimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyltrimethoxysilane, 9,10-epoxydecyltrimethoxysilane, 1,3bis(2,3-epoxypropyl)tetramethoxydisiloxane, 1,3-bis(6,7-epoxyheptyl)tetramethoxydisiloxane, 2-(3,4-epoxycyclohexyl) ethyltrimeth-oxysilane, and the like.

The tetrafunctional silanes useful in the formulation of the coating compositions of the protective polymeric hard coating are represented by the formula $Si(OR_7)_4$ where $R_7$ is H, an alkyl group containing from 1 to about 5 carbon atoms and ethers thereof, an $(OR_7)$ carboxylate, a $—Si(OR_8)_3$ group where $R_8$ is a H, an alkyl group containing from 1 to about 5 carbon atoms and ethers thereof, an $(OR_7)$ carboxylate, or another $—Si(OR_8)_3$ group and combinations thereof. Examples of tetrafunctional silanes represented by the formula $Si(OR_7)_4$ are tetramethyl orthosilicate, tetraethyl orthosilicate, tetrapropyl orthosilicate, tetraisopropyl orthosilicate, tetrabutyl orthosilicate, tetraisobutyl orthosilicate, tetrakis(methoxyethoxy)silane, tetrakis(methoxypropoxy) silane, tetrakis(ethoxyethoxy)silane, tetrakis(methoxyethoxyethoxy) silane, trimethoxyethoxysilane, dimethoxydiethoxysilane, triethoxymethoxysilane, poly(dimethoxysiloxane), poly(diethoxysiloxane), poly(dimethoxydiethoxysiloxane), tetrakis(trimethoxysiloxy) silane, tetrakis-(triethoxysiloxy)silane, and the like. In addition to the $R_7$ and $R_8$ substituents described above for the tetrafunctional silane, $R_7$ and $R_8$ taken with oxygen $(OR_7)$ and $(OR_8)$ can be carboxylate groups. Examples of tetrafunctional silanes with carboxylate functionalities are silicon tetracetate, silicon tetrapropionate and silicon tetrabutyrate.

The multifunctional compounds which can be employed in the formulation of the coating compositions of the protective polymeric hard coating can be any multifunctional carboxylic acid, multifunctional anhydride, and combinations thereof which is compatible with the epoxy functional silane and the tetrafunctional silane of the coating compositions and which is capable of interacting with the hydrolysis products and partial condensates of the epoxy functional silane and the tetrafunctional silane to provide a coating composition which, upon curing, produces a substantially transparent, abrasion resistant protective hard coating.

Examples of multifunctional carboxylic acids which can be employed as the multifunctional compound in the compositions of the protective polymeric hard coating include malic acid, aconitic acid (cis,trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanediacetic acid, 1,3,5-cyclohexanetricarboxylic acid, and unsaturated dibasic acids such as fumaric acid and maleic acid, and combinations thereof.

Examples of multifunctional anhydrides which can be employed as the multifunctional compound in the coating compositions of the protective polymeric hard coating include the cyclic anhydrides of the above mentioned dibasic acids such as succinic anhydride, itaconic anhydride, glutaric anhydride, trimellitic anhydride, pyromellitic anhydride, phthalic anhydride and maleic anhydride, and combinations thereof.

As discussed above, the coating compositions of the protective polymeric hard coating may further include from about 0.1 to about 50 weight percent, based on the weight of total solids of the coating composition, of a mixture of hydrolysis products and partial condensates of one or more monofunctional, difunctional, and/or trifunctional silanes (including the mixtures thereof). These silanes which may be incorporated into the coating compositions of the protective polymeric hard coating have the formula $R_9xSi(OR_{10})_{4-x}$ where x is a number of 1, 2 or 3; $R_9$ is H, or an alkyl group containing from 1 to about 10 carbon atoms, a functionalized alkyl group, an alkylene group, an aryl group an alkyl ether group and combinations thereof; $R_{10}$ is H, an alkyl group containing from 1 to about 10 carbon atoms, an acetyl group; and combinations thereof. Examples of such suitable silanes represented by the above-defined formula include methyltrimethoxysilane, ethyl-trimethoxysilane, propyltrimethoxysilane, butyltrimethoxysilane, isobutyltrimethoxysilane, hexyltrimethoxysilane, octyltrimethoxysilane, decyltrimethoxysilane, cyclohexyltrimethoxysilane, cyclo-hexylmethyltrimethoxysilane, 3-methacryloxypropyltrimethoxysilane, vinyltrimethoxysilane, allyltrimethoxysilane, dimethyldimethoxy-silane, 2-(3-cyclohexenyl)ethyltrimethoxysilane, 3-cyanopropyltrimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyl-trimethoxysilane, chloromethyltriethoxysilane, 2-chloroethyltriethoxysilane, 3-chloropropyltriethoxysilane, phenyl-triethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyltriethoxysilane, cyclohexylmethyltriethoxysilane, 3-methacryloxy-propyltriethoxysilane, vinyltriethoxysilane, allyltriethoxysilane, [2-(3-cyclohexenyl)ethyltriethoxysilane, 3-cyanopropyltriethoxysilane, 3-methacrylamidopropyltriethoxysilane, 3-methoxypropyltrimethoxysilane, 3-ethoxypropyltrimethoxysilane, 3-propoxypropyltrimethoxysilane, 3-methoxyethyltrimethoxysilane, 3-ethoxy-ethyltrimethoxysilane, 3-propoxyethyltrimethoxysilane, 2-[methoxy-(polyethyleneoxy)propyl]heptamethyltrisiloxane, [methoxy(poly-ethyleneoxy)propyl]trimethoxysilane, [methoxy(polyethyleneoxy)ethyl]trimethoxysilane, [methoxy(polyethyleneoxy)propyl]-triethoxysilane, and [methoxy(polyethyleneoxy)ethyl]triethoxysilane.

As indicated above, coating compositions of the protective polymeric hard coating may further include colloidal silica. Colloidal silica is commercially available under a number of different tradename designations, including NALCOAG (Nalco Chemical Co., Naperville, Ill.); NYACOL (Nyacol Products, Inc., Ashland, Mass.); SNOWTEX (Nissan Chemical Industries, LTD., Tokyo, Japan); LUDOX (DuPont Company, Wilmington, Del.); and HIGHLINK OG (Hoechst Celanese, Charlotte, N.C.). The colloidal silica is an aqueous or organic solvent dispersion of particulate silica and the various products differ principally by particle size, silica concentration, pH, presence of stabilizing ions, solvent makeup, and the like. It is understood by those skilled in the art that substantially different product properties can be obtained through the selection of different colloidal silicas.

In the same manner as the colloidal silica, other metal oxides may further be included in the coating compositions of the protective polymeric hard coating. Such additions may be made instead of, or in addition to, any colloidal silica additions. Metal oxides may be added to the protective coatings to provide or enhance specific properties of the cured coating, such as abrasion resistance, refractive index, anti-static, anti-reflectance, weatherability, etc. It will be recognized by those skilled in the art that similar types of considerations that apply to the colloidal silica additions will also apply more generally to the metal oxide additions. Examples of metal oxides which may be used in the coating compositions of the protective polymeric hard coating include silica, zirconia, ceria, tin oxide, and mixtures thereof.

The amount of colloidal silica incorporated into the coating compositions of the protective polymeric hard coating can vary widely and will generally depend on the desired properties of the cured coating produced from the coating compositions, as well as the desired stability of the coating compositions. Similarly, the amount of metal oxides incorporated into the coating compositions of the protective polymeric hard coating can vary widely and will generally depend on the desired properties of the cured coating produced from the coating compositions, as well as the desired stability of the coating compositions.

When colloidal silica and/or metal oxides are added, it is desirable to add from about 0.1 to about 50 weight percent of solids of the colloidal silica and/or metal oxides, based on the total solids of the coating composition, to the coating compositions of the protective polymeric hard coating. The colloidal silica and/or metal oxides will generally have a particle size in the range of 2 to 150 millimicrons in diameter, and more desirably, a particle size in the range of from about 2 to 50 millimicrons.

As discussed above, the coating compositions of the protective polymeric hard coating may further include a suitable blocked isocyanate. It is believed that the suitable blocked isocyanates can result in improved the environmental durability of the coating, resistance to adhesion failure and cracking. The blocked isocyanates can be provided in any suitable amount. For example, the blocked isocyanates can comprise about 0.1 percent by weight to about 15 percent based on the weight of the total coating composition.

Examples of suitable blocked isocyanates include, but are not limited to, DESMODUR BL 3175A, DESMODUR BL3370MPA, DESMODUR BL3175SN, DESMODUR BL3475BASN, and DESMODUR BL4265SN available from Covestro LLC; and TRIXENE BI7951, TRIXENE BI7960, TRIXENE BI7961, TRIXENE BI7963, TRIXENE BI7981, TRIXENE B17982, TRIXENE AQUA BI200, TRIXENE AQUA BI201, and TRIXENE AQUA B1220 available from Chemtura Corp.

The protective polymeric hard coating composition may further include polyol adhesion promoters. Examples of suitable polyol adhesion promoters include, but not limited to monomeric polyols such as trimethylolpropane, trimethylolethane, pentaerythritol, dipentaerythritol, hexanediols such as 1,6-hexanediol, butanediols such as 1,4-butanediol, heptanediols such as 1,7-heptanediol, octanediols such as 1,8-octanediol, and the like; and polymeric polyols including but not limited to polyether polyols, such as polyethylene glycol, polypropylene glycol, and poly(tetramethylene ether) glycol; polyester polyols such as polycaprolactone polyols; polycarbonate polyols; polyestercarbonate polyols; polyurethane polyols; and combinations thereof.

The protective polymeric hard coating composition may further include tint additives. The tint additive includes those represented by the general formula: $R_1$—$(OCH_2CH_2)_n$—$O$—$R_2$ wherein at least one of $R_1$ and R2 is a silicon containing compound represented by the general formula:

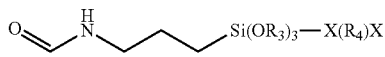

where $R_3$ is H, an alkyl group containing from about 1 to about 5 carbon atoms, or an acetyl group, and where $R_4$ is H, an epoxy functional group, an alkyl group, a functional alkyl group, an alkylene group, an aryl group, an alkyl ether, and combinations thereof containing from about 1 to about 10 carbon atoms, and where X is an integer from 0 to about 3 and n is a positive integer greater than 1. Where only one of $R_1$ and $R_2$ is the silicon containing compound represented by the general formula shown above, the other is H. For example, if only $R_1$ is the silicon containing compound in the general formula, then $R_2$ would be H. On the other hand, if only $R_2$ is the silicon containing compound shown in the general formula, then $R_1$ would be H. Preferably, both $R_1$ and $R_2$ are silicon containing compounds and even more preferably, the silicon containing compounds as represented by the general formula shown above. Examples of such compounds are: Bis(N-(triethoxysilylpropyl))-O,O'-polyethyleneoxide urethane; Bis(N-trimethoxysilylpropyl))-O,O'-polyethyleneoxide urethane; Bis(N-dimethylhydroxysilylpropyl))-O,O'-polyethyleneoxide urethane; Bis(N-dimethoxymethylsilylpropyl))-O,O'-polyethyleneoxide urethane; Bis(N-dimethylmethoxysilylpropyl))-O,O'-polyethyleneoxide urethane; Bis(N-dimethylethoxysilylpropyl))-O—O'-polyethyleneoxide urethane; Bis(N-tributoxysilylpropyl))-O,O'-polyethyleneoxide urethane; Bis(N-dimethoxyphenylsilylpropyl))-O—O'-polyethyleneoxide urethane; Bis(N-diethoxyphenylsilylpropyl))-O—O'-polyethyleneoxide urethane; and the like. In a particular embodiment, the tint additive is a modified polyethylene oxide ("PEO") polymer that has been silylated.

The protective polymeric hard coating composition may further comprise a UV absorber, a hindered amine light stabilizer (HALS), and combinations thereof. Examples of suitable UV absorbers that may be used in the coating compositions include, but are not limited to, 2-hydroxybenzophenones (BPs) (commercial examples include CHIMASSORB 81 and CHIMAS SORB 90, both available from BASF of Germany); 2-(2-hydroxyphenyl)-benzotriazoles (HPBTs) (commercial examples include TINUVIN 1130, TINUVIN 384-2, TINUVIN 928, and TINUVIN 900 (all from BASF); and 2-hydroxyphenyl-s-triazines (HPTs) (commercial examples include, but are not limited to, TINUVIN 400, TINUVIN 405 (both from BASF). Examples of suitable HALS that may be used in the coating compositions include, but are not limited to, 2,2,6,6-tetramethyl piperidine and its derivatives (commercial examples include TINUVIN 152, TINUVIN 292, both from BASF).

Although a catalyst is not an essential ingredient of the protective polymeric hard coating, the addition of a catalyst can affect abrasion resistance and other properties of the coating including stability, tinting capacity, porosity, cosmetics, caustic resistance, water resistance and the like. The amount of catalyst used can vary widely, but when present will generally be in an amount sufficient to provide from about 0.1 to about 10 weight percent, based on the total solids of the composition.

Examples of catalysts which may further be included in the coating compositions of the protective polymeric hard coating include (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides and (viii) fluoride salts. Thus, examples of such catalysts include for group (i) such compounds as aluminum, zinc, iron and cobalt acetylacetonates; for group (ii) dicyandiamide; for group (iii) such compounds as 2-methylimidazole, 2-ethyl-4-methylimidazole and 1-cyanoethyl-2-propylimidazole; for group (iv), such compounds as benzyldimethylamine, and 1,2-diaminocyclohexane; for group (v), such compounds as trifluoromethanesulfonic acid; for group (vi), such compounds as sodium acetate, for group (vii), such compounds as sodium hydroxide, and potassium hydroxide; and for group (viii), tetra n-butyl ammonium fluoride, and the like.

An effective amount of a leveling or flow control agent may further be included in the composition to more evenly spread or level the composition on the surface of the substrate and to provide substantially uniform contact with the substrate. The amount of the leveling or flow control agent can vary widely, but generally is an amount sufficient to provide the coating composition with from about 10 to about 5,000 ppm of the leveling or flow control agent. Any conventional, commercially available leveling or flow control agent which is compatible with the coating composition and the substrate and which is capable of leveling the coating composition on a substrate and which enhances wetting between the coating composition and the substrate may be employed.

Examples of such leveling or flow control agents which may be incorporated into the coating compositions of the protective polymeric hard coating include polyethers (commercially available as TRITON X-100, X-405, and N-57 from Dow Chemical of Midland, Mich.), silicones (commercially available as PAINT ADDITIVE 3, PAINT ADDITIVE 29, PAINT ADDITIVE 57, FZ-77, FZ-2123, and FZ-7604 from Dow Corning of Midland, Mich.; BYK333, BYK377, BYK306 from BYK-Chemie GmbH, Germany; and COATOSIL 77 and COATOSIL 7600 from Momentive of Columbus, Ohio), fluorosurfactants (commercially available as FLUORAD FC-4430 from 3M Corporation of St. Paul, Minn.), fluorosilicones, polyacrylates, silicone polyacrylates such as silicone hexaacrylate, and fluoro-modified polyacrylates.

If the coating compositions of the protective polymeric hard coating are radiation curable, suitable cationic and/or radical photoinitiators are added in an amount from about 0.5 to about 10 weight percent, based on the total solids of the composition.

Examples of cationic photoinitiators which can be incorporated into the coating compositions of the protective polymeric coatings include aromatic onium salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts such as diphenyliodonium chloride and diaryl iodonium hexafluoroantimonate. The aromatic onium salts and their use as cationic initiators in the polymerization of epoxy compounds are described in detail in U.S. Pat. Nos. 4,058,401; 4,069,055; 4,101,513; and 4,161,478. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115.

Examples of radical photoinitiators which may further be included in the coating compositions of the protective polymeric hard coatings include benzoin; substituted benzoins such as butyl isomers of benzoin ethers; benzophenone; substituted benzophenones such as hydroxy benzophenone; 2-hydroxyethyl-N-maleimide; 2-[2-hydroxyethyl(methyl)amino]ethanol anthraquinone; thioxanthone; α,α-di ethoxyacetophenone; 2,2-dimethoxy-1,2-diphenylethan-1-one; 2-hydroxy-2-methyl-1-phenyl-propan-1-one; diphenyl(2,4,6-trimethylbenzoyl)phosphine oxide, phenyl glyoxylic acid methyl ester; 1-hydroxylcyclohexyl phenyl ketone; 2-benzyl-2-dimethylamino-1-(4-morpholinophenyl)-butanone-1; 2-dimethylamino-2-(4-methyl-benzyl)-1-(4-morpholin-4-yl-phenyl)-butan-1-one; 2-methyl-1-[4-(methylthio)phenyl]-2-morpholinopropan-1-one; and 1-[4-(2-hydroxyethoxy)-phenyl]-2-hydroxy-2-methyl-1-propane-1-one.

In some embodiments, especially for transparent photochromic articles, such as for instance, optic lenses, visors, glazing and window treatment films, it is desirable to select a protective polymeric hard coating that is capable of being subsequently sputter coated or electron-beam coated with inorganic anti-reflective coatings to reduce incident visible light reflection to preferably below 5%, more preferably below 2% and most preferably below 1%.

Adhesion Promoter Layer

In some cases, it may be necessary to apply an adhesion promoter (also interchangeably referred to as a "primer") layer to the surface of the substrate before application of the photochromic coating of the present invention. In some cases, it may be necessary to apply an adhesion promoting primer layer to the surface of the photochromic coating before application of the protective polymeric hard coating. Any suitable adhesion promoter can be used, including any suitable organic adhesion promoter (or organic primer), to form the adhesion promoter (or primer) layer. Such adhesion promoter (or primer) layers may be formed from a polyurethane solution, a thermoplastic acrylic polymer solution, or mixtures thereof. For example, a polyurethane dispersion-based primer can be used. Examples of such suitable primers are detailed in U.S. Pat. No. 5,316,791. Examples of such suitable primers include PDR153X2, PR1165, and CP620 etc. available from SDC Technologies, Inc. The primer can be applied to a substrate or on top of photochromic coating and air or thermally dried, e.g., air-dried for less than about 60 min, and the coating composition can be subsequently applied and cured. Application of the primer can be by any of the methods used in coating technology such as, for example, spray coating, spin coating, flow coating, spread coating, curtain coating, dip coating, casting, roll-coating, or conventional printing techniques, such as flexographic, lithographic, digital and screen printing.

Photochromic Article

The photochromic articles of the present invention comprising the substrate, the thermoplastic photochromic coating, protective polymeric hard coating, and optional adhesion promoter layer(s) or any of its component layers may be disposed on one or both opposing surfaces of the substrate. Table 1 depicts exemplary embodiments of the possible assembly configurations of the inventive photochromic articles of the present disclosure. Adhesion Promoter 1 refers to an adhesion promoter layer interposed between the substrate and the photochromic coating. Adhesion Promoter 2 refers to an adhesion promoter layer interposed between the photochromic coating and the protective hard coating.

TABLE 1

| Possible Photochromic Assembly Configurations | | | | | | | |
|---|---|---|---|---|---|---|---|
|  | A | B | C | D | E | F | G |
| Protective Hard Coat | ✓ | ✓ | ✓ | ✓ | ✓ | ✓ | ✓ |
| Adhesion Promoter 2 |  |  |  |  |  |  |  |
| Photochromic Coating | ✓ | ✓ | ✓ | ✓ | ✓ | ✓ | ✓ |
| Adhesion Promoter 1 |  |  |  | ✓ | ✓ | ✓ | ✓ |
| SUBSTRATE | SUBSTRATE | SUBSTRATE | SUBSTRATE | SUBSTRATE | SUBSTRATE | SUBSTRATE | SUBSTRATE |
| Adhesion Promoter 1 |  |  |  |  |  | ✓ | ✓ |
| Photochromic Coating |  |  | ✓ |  |  |  | ✓ |
| Adhesion Promoter 2 |  |  |  |  |  |  |  |
| Protective Hard Coat |  | ✓ | ✓ |  | ✓ | ✓ | ✓ |
|  | H | I | J | K | L | M |  |
| Protective Hard Coat | ✓ | ✓ | ✓ | ✓ | ✓ | ✓ |  |
| Adhesion Promoter 2 | ✓ | ✓ | ✓ | ✓ | ✓ | ✓ |  |

TABLE 1-continued

Possible Photochromic Assembly Configurations

| Photochromic Coating | ✓ | ✓ | ✓ | ✓ | ✓ | ✓ |
|---|---|---|---|---|---|---|
| Adhesion Promoter 1 |  |  |  | ✓ | ✓ | ✓ |
| SUBSTRATE | SUBSTRATE | SUBSTRATE | SUBSTRATE | SUBSTRATE | SUBSTRATE | SUBSTRATE |
| Adhesion Promoter 1 |  |  |  |  |  | ✓ |
| Photochromic Coating |  |  | ✓ |  |  | ✓ |
| Adhesion Promoter 2 | ✓ | ✓ |  |  | ✓ | ✓ |
| Protective Hard Coat | ✓ | ✓ | ✓ | ✓ | ✓ | ✓ |

Photochromic Assembly Configuration A comprises a photochromic layer disposed on one surface of the substrate and a protective hard coating disposed over the photochromic layer, whereas in Photochromic Assembly Configuration B, although the photochromic layer is disposed on only one surface of the substrate, the protective hard coating is disposed on both opposing surfaces of the substrate. In Configuration C, both the photochromic and hard coating layers are disposed on both opposing surfaces of the substrate. Additional configurations incorporating one or both adhesion promoter layers on one or both surfaces of the substrate are depicted in Configurations D through M. One-sided photochromic assemblies such as Configurations A, D and H may be manufactured by spin, spray, flow, curtain, slot-die, or gravure coating methods. Spin, spray and flow methods are most suitable for manufacturing one-sided photochromic assemblies on cast or molded parts, for instance, optical elements such as lenses and visors. Curtain, slot-die and gravure coating methods are most suitable for wide format, flat substrates such as film and sheet.

Fully two-sided photochromic assemblies such as Configurations C, G, J and M can be manufactured by the coating techniques used for one-sided assemblies by sequential or simultaneous application of the assembly layers on both opposing surfaces of the substrate. However, dip coating is the preferred method for manufacturing two-sided assemblies due to reduced cost and higher throughput.

For photochromic assemblies such as Configurations B, E, F, K, I and L that comprise a combination of single sided and dual-sided component layers, a combination of single side and dual side coating methods may be employed. For instance, to coat an ophthalmic lens substrate in Configuration B, the photochromic layer can be applied to the convex surface of the lens substrate using spin, spray or flow coating method followed by solidification (desolvation) of the photochromic coating to yield a photochromic coated substrate. The coated lens substrate can then be dip coated with the protective hard coating and the hard coating cured to yield a photochromic lens article comprising a photochromic layer on one surface of the lens and a protective hard coating on both surfaces of the lens.

The present invention is more particularly described in the following examples, which are intended as illustrative only, since numerous modifications and variations therein will be apparent to those skilled in the art. All liquid compositions are based on weight percent concentration of constituents unless indicated otherwise.

EXAMPLES

A. Description of Tests

1. Total Solids Weight in Coating: The weight % solids in the coating liquid was determined by measuring the residual weight of 1 ml coating sample after drying in a convection oven at 120° C. for 2 hours and dividing that amount by the original weight of the 1 ml coating sample before drying.

2. Appearance: Coated specimens were visually inspected for cosmetic defects such as pits, spots, inclusions, flow lines, cracks and crazing of the coating. A rating of "Pass" was given to coated articles that were substantially free of such defects.

3. Coating Thickness: The thickness of cured or desolvated coating was measured in micrometer units (um or μm) with a Filmetrics F20 Thin Film Analyzer (Filmetrics, San Diego, Calif.) and reported in micrometer units.

4. Haze: Light transmittance and light-scattering properties of the cured coating was evaluated by measuring haze according to ASTM D 1003 standard with a Haze-gard Plus (BYK-Gardner, Columbia, Md.) hazemeter.

5. Cross-Hatch Adhesion: Adhesion is the ability of a coating to adhere to a substrate. The cross-hatch adhesion was tested using a roll of pressure sensitive tape 3M Brand SCOTCH™ 600 tape. The test was carried out as follows: 1) a cross-hatch of a 6×6 grid, approximately 1.5 mm apart was made with a retractable razor blade into the cured or desolvated coating; 2) the tape was pressed down firmly (using a tongue depressor) over the cross-hatched area; 3) a check for the removal of the coating was made by examination of the coated substrate using appropriate visual control; 4) the subject area was also inspected under a microscope; 5) the actual count of unaffected areas was reported as percent adhesion (when adhesion was affected along a line only, the estimate is converted into percentages).

6. Bayer Abrasion Test: Bayer abrasion test is a quantitative measure of the abrasion resistance of a coated specimen relative to that of an uncoated CR39 standard. For the Bayer Abrasion Test, specimens coated on CR-39 Plano lenses were used. The test was carried out in a Colts Laboratory BTE Abrasion Tester using 500 g of Norton ZF#12 Alundum abrasion media. Uncoated Silor Optical CR-39 Plano lenses were used as standard. After 600 strokes, the change in haze of coated specimen and CR-39 standard were noted. The Bayer Ratio (B.R.) was reported as percentage difference in haze of uncoated CR-39 standard divided by the percentage difference in haze of coated CR-39 specimen.

7. Strippability Test: A piece of cheese cloth was soaked with PM glycol ether or MEK solvent. The photochromic coated specimen was wiped with the solvent soaked cheese cloth from one side to the other side in one motion. The lens was wiped a total of 4 times, each time with a different piece of solvent soaked cheese cloth. After 4 wipes, the coated surface was visually inspected for removal of the photochromic coating.

8. Photochromic Performance Test on a Transparent Photochromic Specimen: Photochromic performance measurements were conducted in accordance with ISO/DIS 8980-3 standard at an ambient temperature of 23±2° C. Direct sunlight and/or Xenon arc lamp were utilized as UV light sources. The photochromic specimen was positioned over an integrating sphere coupled with an instantaneous multichannel photodetector and exposed to 380-780 nm visible light spectrum for 30 seconds. The sample was then irradiated for 15 minutes with UV light from the UV light source while spectral transmittance data was collected over 380-780 nm wavelengths at 15 s intervals. The UV light source was subsequently removed and spectral transmittance data collection over 380-780 nm wavelengths at 15 s intervals was continued for an additional 15 minutes.

Referring to the FIGURE, the FIGURE shows a schematic of a typical photochromic response output. The response consists of 4 main sections:

Section A-B: Decrease in initial light transmittance or darkening of lens with time of UV exposure;

Section B-C: Maximum darkening or minimum light transmittance achieved within 15 minutes of UV exposure;

Section C-D: Increase in light transmittance or fading of lens with time after removal of UV exposure; and Section D-E: Maximum fading achieved 15 minutes after removal of UV exposure.

To is the initial % Light transmittance through the photochromic specimen before UV exposure.

$T_{50}=0.5*T_0$, i.e. 50% of initial % Light transmittance.

$T_{70}=0.7*T_0$, i.e. 70% of initial % Light transmittance.

$T_m$ is the minimum % Light transmittance attained after 15 minutes of continuous UV exposure.

$t\_d_{50}$ is the time to darken from $T_0$ to $T_{50}$ during UV exposure.

$t\_f_{70}$ is the time to fade from $T_m$ to $T_{70}$ after removal of UV exposure.

B. Description of Abbreviations of Materials Used

TABLE 2A

Thermoplastic Acrylic Polymers

| Abbreviation | Polymer Grade | Supplier | Base Composition |
|---|---|---|---|
| A11 | PARALOID A-11 | Dow Chemical | PMMA |
| A14 | PARALOID A-14 | Dow Chemical | PMMA |
| A21 | PARALOID A-21 | Dow Chemical | PMMA |
| B48 | PARALOID B-48N | Dow Chemical | poly (MMA/nBA) |
| BR117 | BR-117 | Dianal | poly (MMA/nBMA) |
| BR121DA | BR-121DA | Dianal | Poly (MMA/nBMA) |
| E2044 | ELVACITE E2044 | Elvacite | poly (nBMA) |
| E2550 | ELVACITE E2550 | Elvacite | poly (MMA/nBMA/MAA) |
| D51N | NANOSTRENGTH D51N | Arkema | (PMMA-co-diacryl amide)-b-poly(nBA) |
| M52N | NANOSTRENGTH M52N | Arkema | (PMMA-co-diacryl amide)-b-poly(nBA)-b-(PMMA-co-diacryl amide) |
| M22N | NANOSTRENGTH M22N | Arkema | (PMMA-co-diacryl amide)-b-poly(nBA)-b-(PMMA-co-diacryl amide) |

TABLE 2A-continued

Thermoplastic Acrylic Polymers

| Abbreviation | Polymer Type | $T_g$ of Low $T_g$ Segment(° C.) | $T_g$ of High $T_g$ Segment(° C.) |
|---|---|---|---|
| A11 | Homopolymer | 100 | not applicable - polymer shows single Tg |
| A14 | Homopolymer | 95 | not applicable - polymer shows single Tg |
| A21 | Homopolymer | 105 | not applicable - polymer shows single Tg |
| B48 | Random/Gradient | 50 | not applicable - polymer shows single Tg |
| BR117 | Random/Gradient | 45 | not applicable - polymer shows single Tg |
| E2044 | Homopolymer | 20 | not applicable - polymer shows single Tg |
| E2550 | Random/Gradient | 36 | not applicable - polymer shows single Tg |
| D51N | AB Diblock Copolymer | below −40 | 90-115 |
| M52N | ABA Triblock Copolymer | below −40 | 90-115 |
| M22N | ABA Triblock Copolymer | below −40 | 90-115 |

TABLE 2B

Photochromic Compounds

| Abbreviation | Photochromic Compound Type |
|---|---|
| Photochromic GO | A spirooxazine type dye which exhibits a gray color when irradiated with ultraviolet light |
| Photochromic GN | A mixture of naphtho(1,2-b) pyran type dyes which exhibits a gray color when irradiated with ultraviolet light |
| Photochromic BN | A mixture of naphtho(1,2-b) pyran type dyes which exhibits a brown color when irradiated with ultraviolet light |

TABLE 2C

Substrate Materials

| Abbreviation | Substrate Description | Nominal Refractive Index |
|---|---|---|
| PC | Factory Coated Polycarbonate Lens | 1.59 |
| CR-39 | CR-39 Polybisallyl Carbonate Lens | 1.50 |
| MR-7 | MR-7 Polythiourethane Lens | 1.67 |
| MR-8 | MR-8 Polythiourethane Lens | 1.60 |
| MR-10 | MR-10 Polythiourethane Lens | 1.67 |
| MR-174 | MR-174 Polyepisulfide Lens | 1.74 |

TABLE 2D

Solvents

| Abbreviation | Chemical Name |
|---|---|
| PM Glycol Ether | 1-methoxy-2-propanol |
| MEK | methyl ethyl ketone |

TABLE 2E

Stabilizers

| Abbreviation | Chemical Name | Supplier |
|---|---|---|
| T292 | TINUVIN 292 | BASF |
| T400 | TINUVIN 400 | BASF |

TABLE 2F

Adhesion Promoter and Protective Coatings for Photochromic Assembly

| Abbreviation | Chemical Name | Manufacturer | Wt % Solids |
|---|---|---|---|
| PDR153X2 | PDR153X2 Polyurethane Primer (adhesion promoter) | SDC Technologies, Inc. | 2.5 |
| PR1165 | CRYSTALCOAT PR1165 Polyurethane Primer (adhesion promoter) | SDC Technologies, Inc. | 4.5 |
| MP1179 | CRYSTALCOAT MP1179 Siloxane Hard Coating (a protective polymeric hard coating in accordance with the present disclosure) | SDC Technologies, Inc. | 23 |
| HARDCOAT 1 | A Siloxane Hard Coating (a protective polymeric hard coating in accordance with the present disclosure) | SDC Technologies, Inc. | 24 |

C. Examples of Photochromic Coating Compositions

Example 1

15.9 g thermoplastic acrylic polymer B48N was slowly added to a beaker of 75 g PM glycol ether with continuous stirring, and subsequently mixed continuously for 3 hours at room temperature. To the mixture, 9 g Photochromic GO and 0.1 g leveling agent BYK-377 were added with continuous stirring and subsequently mixed for an additional 2 hours at room temperature and filtered through a 6 um filter. The resulting mixture had a photochromic compound to thermoplastic polymer ratio of 56.6%.

Examples 2-11 and Comparative Examples C1-C3

Examples 2-11 and Comparative Examples C1-C3 were prepared using the method of Example 1 but with thermoplastic polymers, photochromic compounds, their corresponding quantities, and solvent quantities shown in Table 3.

TABLE 3

Photochromic Coating Compositions

|  | Comparative C1 | Comparative C2 | Comparative C3 | Example 1 | Example 2 |
|---|---|---|---|---|---|
| A11 (g) | 15.3 |  |  |  |  |
| A14 (g) |  | 16.5 |  |  |  |
| A21 (g) |  |  | 13.2 |  |  |
| B48 (g) |  |  |  | 15.9 |  |
| BR117 (g) |  |  |  |  | 15.3 |
| E2044 (g) |  |  |  |  |  |
| E2550 (g) |  |  |  |  |  |
| D51N (g) |  |  |  |  |  |
| M52N (g) |  |  |  |  |  |
| M22N (g) |  |  |  |  |  |
| BYK-377 Leveling Agent (g) | 0.1 | 0.1 | 0.1 | 0.1 | 0.1 |
| Photochromic GO (g) | 8.6 | 9.4 | 7.7 | 9.0 | 8.6 |
| Photochromic GN (g) |  |  |  |  |  |
| PM Glycol Ether (g) | 76 | 74 | 79 | 75 | 76 |
| Total (g) | 100 | 100 | 100 | 100 | 100 |
| Total Solids by weight | 24% | 26% | 22% | 25% | 24% |
| Photochromic Compound to Thermoplastic Polymer Ratio | 56.2% | 57.0% | 58.3% | 56.6% | 56.2% |

|  | Example 3 | Example 4 | Example 5 | Example 6 | Example 7 |
|---|---|---|---|---|---|
| A11 (g) |  |  |  |  |  |
| A14 (g) |  |  |  |  |  |
| A21 (g) |  |  |  |  |  |
| B48 (g) |  |  |  |  |  |
| BR117 (g) |  |  |  |  |  |
| E2044 (g) | 15.3 |  |  |  |  |
| E2550 (g) |  | 16.5 |  |  |  |
| D51N (g) |  |  | 17.8 |  |  |
| M52N (g) |  |  |  | 17.2 |  |
| M22N (g) |  |  |  |  | 16.5 |
| BYK-377 Leveling Agent (g) | 0.1 | 0.1 | 0.1 | 0.1 | 0.1 |
| Photochromic GO (g) | 8.6 | 9.4 | 10.1 | 9.7 | 9.4 |
| Photochromic GN (g) |  |  |  |  |  |

TABLE 3-continued

| Photochromic Coating Compositions | | | | | |
|---|---|---|---|---|---|
| PM Glycol Ether (g) | 76 | 74 | 72 | 73 | 74 |
| Total (g) | 100 | 100 | 100 | 100 | 100 |
| Total Solids by weight | 24% | 26% | 28% | 27% | 26% |
| Photochromic Compound to Thermoplastic Polymer Ratio | 56.2% | 57.0% | 56.7% | 56.4% | 57.0% |

| | Example 8 | Example 9 | Example 10 | Example 11 |
|---|---|---|---|---|
| A11 (g) | | | | |
| A14 (g) | | | | |
| A21 (g) | | | | |
| B48 (g) | 15.9 | | | |
| BR117 (g) | | 15.9 | | |
| E2044 (g) | | | | |
| E2550 (g) | | | 15.9 | |
| D51N (g) | | | | |
| M52N (g) | | | | 17.2 |
| M22N (g) | | | | |
| BYK-377 Leveling Agent (g) | 0.1 | 0.1 | 0.1 | 0.1 |
| Photochromic GO (g) | | | | |
| Photochromic GN (g) | 9.0 | 9.0 | 9.0 | 9.7 |
| PM Glycol Ether (g) | 75 | 75 | 75 | 73 |
| Total (g) | 100 | 100 | 100 | 100 |
| Total Solids by weight | 25% | 25% | 25% | 27% |
| Photochromic Compound to Thermoplastic Polymer Ratio | 56.6% | 56.6% | 56.6% | 56.4% |

As indicated by the "Photochromic Dye to Thermoplastic Polymer Ratio" in Table 3, all of the coating compositions prepared from the thermoplastic acrylic polymers listed in Table 3 incorporated greater than 40 parts by weight of photochromic compound per 100 parts by weight of the thermoplastic polymer.

Each photochromic coating composition from Table 3 was applied via spin-coating to individual MR-8 lenses that had been pre-washed with 10% Simple Green detergent solution in de-ionized (DI) water and dried with compressed air. The following spin-coating procedure was used: the photochromic coating composition was manually dispensed via a pipette onto the convex surface of the lens while spinning the lens at 600 rpm for 5 seconds. The dispensing was then discontinued and the lens was spun at a speed of 800-900 rpm for 20 seconds to evenly distribute the coating across the lens. The coated lens was then dried in a convection oven at 100° C. for 30 minutes to desolvate (solidify) the coating.

The physical properties of the coated lenses and their photochromic performance on exposure to direct sunlight are listed in Table 4.

TABLE 4

Performance of Photochromic Coating - Invention
Examples 1-11, Comparative Examples C1-C3

| | Comparative C1 | Comparative C2 | Comparative C3 | Example 1 | Example 2 |
|---|---|---|---|---|---|
| Substrate | MR-8 | MR-8 | MR-8 | MR-8 | MR-8 |
| Coating Thickness (μm) | 7.3 | 7.5 | 6.3 | 7.6 | 8.8 |
| Appearance | Some flow lines | Some flow lines | Some flow lines | Pass | Pass |
| Haze (%) | 0.24 | 0.33 | 0.27 | 0.32 | 0.33 |
| Cross-Hatch Adhesion % | 50 | 50 | 60 | 50 | 10 |
| Strippability with PM glycol ether | Yes | Yes | Yes | Yes | Yes |
| UV Source: Direct Sunlight | | | | | |
| $T_0$ Darkening Rate | 81% | 82% | 82% | 82% | 81% |
| $t\_d_{50}$ | not attained | not attained | not attained | 103 s | 90 s |
| $T_m$ Fading Rate | 54% | 54% | 59% | 32% | 31% |
| $t\_f_{70}$ | | | | not attained | not attained |

TABLE 4-continued

Performance of Photochromic Coating - Invention
Examples 1-11, Comparative Examples C1-C3

|  | Example 3 | Example 4 | Example 5 | Example 6 | Example 7 |
|---|---|---|---|---|---|
| Substrate | MR-8 | MR-8 | MR-8 | MR-8 | MR-8 |
| Coating Thickness (μm) | 8.9 | 7.8 | 6.4 | 6.9 | 7.6 |
| Appearance | Pass | Pass | Slight waviness (orange peel) | Pass | Pass |
| Haze (%) | 0.35 | 0.36 | 0.30 | 0.42 | 0.30 |
| Cross-Hatch Adhesion % | 50 | 100 | 100 | 100 | 100 |
| Strippability with PM glycol ether | Yes | Yes | Yes | Yes | Yes |
| UV Source: Direct Sunlight | | | | | |
| $T_0$ Darkening Rate | 84% | 83% | 86% | 85% | 84% |
| $t\_d_{50}$ | 27 s | 16 s | 9 s | 9 s | 9 s |
| $T_m$ Fading Rate | 13% | 11% | 24% | 24% | 24% |
| $t\_f_{70}$ | not attained | not attained | 179 s | 173 s | 185 s |

|  | Example 8 | Example 9 | Example 10 | Example 11 |
|---|---|---|---|---|
| Substrate | MR-8 | MR-8 | MR-8 | MR-8 |
| Coating Thickness (μm) | 7.2 | 10.2 | 11.6 | 8.0 |
| Appearance | Pass | Pass | Pass | Pass |
| Haze (%) | 0.13 | 0.10 | 0.11 | 0.10 |
| Cross-Hatch Adhesion % | 100 | 100 | 100 | 100 |
| Strippability with PM glycol ether | Yes | Yes | Yes | Yes |
| UV Source: Direct Sunlight | | | | |
| $T_0$ Darkening Rate | 90% | 90% | 90% | 90% |
| $t\_d_{50}$ | 9 s | 9 s | 9 s | 7 s |
| $T_m$ Fading Rate | 21% | 21% | 19% | 20% |
| $t\_f_{70}$ | 180 s | 75 s | 105 s | 68 s |

From Table 4 it is readily evident that the comparative photochromic coating compositions C1-C3 that were prepared using thermoplastic acrylic polymers with Tg above 50° C. did not attain the desired level of darkening of 50% of initial light transmission; however, all of the photochromic coating compositions prepared using thermoplastic acrylic polymers that had either a single Tg of 50° C. or below, or a polymer segment with a Tg of 50° C. or below, attained the desired level of darkening. The compositions prepared from diacrylamide functionalized poly (methyl methacrylate) diblock and triblock copolymers exhibited excellent darkening and fading response regardless of the type of photochromic compound used. All of the coating compositions, including comparative examples C1-C3, were easily stripped with PM glycol ether.

Comparative Example C4

5 g Photochromic GO, 1 g Irgacure 184 and 1 g Irgacure 819 photoinitiators were added to 100 g of polymerizable monomers consisting of 50 g polyethylene glycol diacrylate with an average molecular weight of 575 (from Aldrich) and 50 g 4-hydroxybutyl acrylate glycidyl ether (from Kowa American Corp). The composition was stirred and mixed at room temperature for 3 hours and filtered through a 2.5 um filter.

A CR-39 lens was etched with a mixture of 10% potassium hydroxide, 40% PM glycol ether and 40% DI water at ambient laboratory temperature (~23-25° C.) for 15 minutes, rinsed thoroughly with city water and then DI water, dried with compressed air, and then spin-coated on the convex surface with the coating composition at a speed of 500 rpm for 5 seconds followed by a spin-off of 1000 rpm for 15 seconds to evenly distribute the coating on the lens surface. The coated surface of the lens was cured under carbon dioxide atmosphere in a Satis Magna Spin G3 machine, equipped with a 400 W/inch D-bulb, at an irradiation dosage of 2.5 J/cm' followed by thermal cure at 120° C. for 2 hours.

Comparative Example C5

20 g Photochromic GO, 1 g Irgacure 184 and 1 g Irgacure 819 photoinitiators were added to 100 g of polymerizable monomers consisting of 50 g polyethylene glycol diacrylate with an average molecular weight of 575 (from Aldrich) and 50 g 4-hydroxybutyl acrylate glycidyl ether (from Kowa American Corp). The composition was stirred and mixed at room temperature for 3 hours and filtered through a 2.5 um filter.

A CR-39 lens was etched with a mixture of 10% potassium hydroxide, 40% PM glycol ether and 40% DI water at ambient laboratory temperature (~23-25° C.) for 15 minutes, rinsed thoroughly with city water and then DI water, dried with compressed air, and then spin-coated on the convex surface with the coating composition at a speed of 500 rpm for 5 seconds followed by a spin-off of 1000 rpm for 15 seconds to evenly distribute the coating on the lens surface. The coated surface of the lens was cured under carbon dioxide atmosphere in a Satis Magna Spin G3 machine, equipped with a 400 W/inch D-bulb, at an irradiation dosage of 2.5 J/cm² followed by thermal cure at 120° C. for 2 hours.

Comparative Example C6

5 g Photochromic GO, 1 g Irgacure 184 and 1 g Irgacure 819 photoinitiators were added to 100 g of polymerizable monomers consisting of 33 g SR238 (from Sartomer) and 67 g Ebecryl 8301R (from Allnex). The composition was stirred and mixed at room temperature for 3 hours and filtered through a 2.5 um filter.

A CR-39 lens was etched with a mixture of 10% potassium hydroxide, 40% PM glycol ether and 40% DI water at ambient laboratory temperature (~23-25° C.) for 15 minutes, rinsed thoroughly with city water and then DI water, dried with compressed air, and then spin-coated on the convex surface with the coating composition at a speed of 500 rpm for 5 seconds followed by a spin-off of 1000 rpm for 15 seconds to evenly distribute the coating on the lens surface. The coated surface of the lens was cured under carbon dioxide atmosphere in a Satis Magna Spin G3 machine, equipped with a 400 W/inch D-bulb, at an irradiation dosage of 2.5 J/cm².

Comparative Example C7

20 g Photochromic GO, 1 g Irgacure 184 and 1 g Irgacure 819 photoinitiators were added to 100 g of polymerizable monomers consisting of 33 g SR238 (from Sartomer) and 67 g Ebecryl 8301R (from Allnex). The composition was stirred and mixed at room temperature for 3 hours and filtered through a 2.5 um filter.

A CR-39 lens was etched with a mixture of 10% potassium hydroxide, 40% PM glycol ether and 40% DI water at ambient laboratory temperature (~23-25° C.) for 15 minutes, rinsed thoroughly with city water and then DI water, dried with compressed air, and then spin-coated on the convex surface with the coating composition at a speed of 500 rpm for 5 seconds followed by a spin-off of 1000 rpm for 15 seconds to evenly distribute the coating on the lens surface. The coated surface of the lens was cured under carbon dioxide atmosphere in a Satis Magna Spin G3 machine, equipped with a 400 W/inch D-bulb, at an irradiation dosage of 2.5 J/cm².

The physical properties of the photochromic coated lenses prepared from radiation and thermally curable coatings of Comparative Examples C4-C7 are listed in Table 5.

TABLE 5

Physical Performance of Photochromic Coating - Comparative Examples C4-C7

| | Comparative C4 | Comparative C5 | Comparative C6 | Comparative C7 |
|---|---|---|---|---|
| Photochromic Compound to Curable Resin Ratio | 5% | 20% | 5% | 20% |
| Substrate | CR-39 | CR-39 | CR-39 | CR-39 |
| Coating Thickness (μm) | 7.8 | Not tested - coating uncured | 15 | Not tested - coating uncured |
| Appearance | Pass | Wet - coating uncured | Pass | Wet - coating uncured |
| Haze (%) | 0.34 | Not tested - coating uncured | 0.30 | Not tested - coating uncured |
| Cross-Hatch Adhesion % | 0 | Not tested - coating uncured | 0 | Not tested - coating uncured |
| Strippability with PM glycol ether | No | Not tested - coating uncured | No | Not tested - coating uncured |
| Strippability with MEK | No | Not tested - coating uncured | No | Not tested - coating uncured |

As shown by the "Photochromic Compound to Curable Resin Ratio" in Table 5, the curable photochromic coating compositions of Comparative Examples C4-C7 were able to incorporate less than 20 parts by weight of photochromic compound per 100 parts by weight of total curable resins, as 20% and higher ratios prevented curing of the coating. The curable photochromic coating compositions with a photochromic compound to curable resin ratio of 5% (compositions C4 and C6) were able to cure sufficiently; however, the cured coatings could not be stripped with PM glycol ether or MEK solvents.

Example 12

15.4 g thermoplastic acrylic polymer M52N was slowly added to a beaker of 75.3 g PM glycol ether with continuous stirring, and subsequently mixed continuously for 3 hours at room temperature. To the mixture, 10.3 g Photochromic GN was added with continuous stirring and subsequently mixed for an additional 2 hours at room temperature and filtered through a 6 um filter. The resulting mixture had a total solids content of 24.7% and a photochromic compound to thermoplastic polymer ratio of 66.8%.

Example 13

15 g thermoplastic acrylic polymer M52N was slowly added to a beaker of 72.5 g PM glycol ether with continuous stirring, and subsequently mixed continuously for 3 hours at room temperature. To the mixture, 10 g Photochromic GN and 2.5 g T292 stabilizer were added with continuous stirring and subsequently mixed for an additional 2 hours at room temperature and filtered through a 6 um filter. The resulting mixture had a total solids content of 27.5% and a photochromic compound to thermoplastic polymer ratio of 66.7%.

Example 14

15.7 g thermoplastic acrylic polymer M52N was slowly added to a beaker of 73 g PM glycol ether with continuous stirring, and subsequently mixed continuously for 3 hours at room temperature. To the mixture, 9.7 g Photochromic GN, 1.5 g T292 stabilizer and 0.1 g BYK-377 leveling agent were added with continuous stirring and subsequently mixed for an additional 2 hours at room temperature and filtered through a 6 um filter. The resulting mixture had a total solids content of 27% and a photochromic compound to thermoplastic polymer ratio of 61.8%.

Example 15

Example 15 was prepared similarly to Example 14, except 9.7 g Photochromic GN was replaced with 9.7 g Photochromic BN.

Example 16

Example 16 was prepared similarly to Example 13, except 2.5 g T292 was replaced with 1.7 g T292 and 0.8 g T400.

Example 17

Example 17 was prepared similarly to Example 13, except 2.5 g T292 was replaced with 0.8 g T292 and 1.7 g T400.

Example 18

10.45 g thermoplastic acrylic polymer M52N was slowly added to a beaker of 82 g PM glycol ether with continuous stirring, and subsequently mixed continuously for 3 hours at room temperature. To the mixture, 6.5 g Photochromic GN, 1 g T292 stabilizer and 0.05 g BYK-333 leveling agent were added with continuous stirring and subsequently mixed for an additional 2 hours at room temperature and filtered through a 6 um filter. The resulting mixture had a total solids content of 18% and a photochromic compound to thermoplastic polymer ratio of 62.2%.

Example 19

2.35 g M52N and 37 g PM glycol ether were mixed at room temperature for 3 hours. To the mixture, 23 g denatured ethanol and 16 g DI water were added. The resulting mixture was left to stir for one hour at room temperature. The resulting mixture had a total solids content of 3%. The coating was used as Adhesion Promoter 2 in Example 32.

Example 20

33.89 g thermoplastic acrylic polymer M52N and 3.77 g thermoplastic acrylic polymer BR121DA were slowly added to a beaker of a mix of 192.5 g PM glycol ether and 87.5 g of PM acetate with continuous stirring, and subsequently mixed continuously for 16 hours at room temperature. To the mixture, 25.2 g Photochromic GN, 6.3 g T292 stabilizer and 0.84 g BYK-377 leveling agent were added with continuous stirring and subsequently mixed for an additional 5 hours at room temperature and filtered through a 6 um filter. The resulting mixture had a total solids content of 20% and a photochromic compound to thermoplastic polymer ratio of 67%.

Example 21

33.89 g thermoplastic acrylic polymer M52N and 3.77 g thermoplastic acrylic polymer BR121DA were slowly added to a beaker of 280 g PM glycol ether with continuous stirring, and subsequently mixed continuously for 16 hours at room temperature. To the mixture, 25.2 g Photochromic GN, 6.3 g T292 stabilizer and 0.84 g BYK-377 leveling agent were added with continuous stirring and subsequently mixed for an additional 5 hours at room temperature and filtered through a 6 um filter. The resulting mixture had a total solids content of 20% and a photochromic compound to thermoplastic polymer ratio of 67%.

D. Examples of Photochromic Articles

1. Configuration B (from Table 1)

Example 22

A PC lens substrate was chemically etched with 10% aqueous sodium hydroxide solution at 60° C. for 10 minutes, rinsed sequentially with city and DI water, and dried with compressed air. A MR-8 and a CR-39 lens substrate were cleaned with 10% Simple Green detergent solution in deionized (DI) water, thoroughly rinsed with DI water, and dried with compressed air. Each of the cleaned lenses was coated as follows:

The lens was mounted on a suction cup and placed in a manual spin coater. 1.5 ml of the photochromic coating of Example 14 was dispensed on the geometric center of the lens via a pipette while spinning the lens at 600 rpm for 5 seconds. The dispensing was then discontinued and the lens was spun at a speed of 800 rpm for 20 seconds to evenly distribute the coating on the lens. The coated lens was then dried in a convection oven at 100° C. for 30 minutes to desolvate and solidify the coating. The lens was air cooled to ambient temperature for 10 minutes and the thickness of the photochromic coating measured at the center of the lens. The photochromic coated lens was then washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

Example 23

The photochromic coating of Example 12 was diluted with PM glycol ether to a solids level suitable for spray coating. A MR-8 lens substrate was cleaned by wiping with a lint-free microfiber wipe pre-soaked in isopropyl alcohol, dried with compressed air and mounted on a turntable. The diluted coating of Example 12 was applied to the lens substrate as a fine mist using a Sono-tek Accumist Spray system, while rotating the lens to achieve a uniform coating layer. The flow rate through the spray nozzle, and turntable speed were adjusted to achieve a coating thickness of from 7 to 8 micrometer after drying the spray coated lens at 100° C. for 30 minutes to desolvate and solidify the coating. The lens was air cooled to ambient temperature for 10 minutes and the thickness of the photochromic coating measured at the center of the lens. The photochromic coated lens was then washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

The physical properties of the coated lenses of Configuration B and their photochromic performance on exposure to direct sunlight are listed in Table 6.

TABLE 6

Performance of Configuration B - Examples 22-23

|  | Example 22 | | | Example 23 |
| --- | --- | --- | --- | --- |
| Substrate | PC | CR-39 | MR-8 | MR-8 |
| Photochromic Coating Thickness (um) | 7.00 | 6.85 | 6.81 | 7.60 |
| Protective Hard Coating Thickness (um) | 2.70 | 2.72 | 2.83 | 2.8 |
| Appearance | Pass | Pass | Pass | Pass |
| Haze (%) | 0.17 | 0.10 | 0.15 | 0.26 |
| Cross-Hatch Adhesion % | 98 | 100 | 99 | 98 |
| Bayer Ratio | | 3.8 | | |
| UV Source: Direct Sunlight | | | | |
| $T_0$ Darkening Rate | 87.2% | 91.3% | 90.9% | 88.7% |
| $t\_d_{50}$ | 15 s | 15 s | 10 s | 10 s |
| $T_m$ Fading Rate | 24.6% | 19.9% | 22.5% | 22% |
| $t\_f_{70}$ | 120 s | 120 s | 120 s | 70 s |

2. Configuration E (from Table 1)

Example 24

A CR-39 and a MR-8 lens substrate were chemically etched with 10% aqueous sodium hydroxide solution at 60° C. for 10 minutes, rinsed sequentially with city and DI water, and dried with compressed air. Each of the cleaned lenses was coated as follows:

The lens was mounted on a suction cup and placed in a manual spin coater. 1.5 ml of PDR153X2 primer was dispensed on the geometric center of the lens via a pipette while spinning the lens at 600 rpm for 5 seconds. The dispensing was then discontinued and the lens spun at 2000 rpm for 20 seconds to evenly distribute and spin-dry the primer. The spin speed was then reduced to 600 rpm and 1.5 ml of the photochromic coating of Example 12 was dispensed on the geometric center of the lens via a pipette while spinning the lens at 600 rpm for 5 seconds. The dispensing was then discontinued and the lens was spun at a speed of 1000 rpm for 20 s seconds to evenly distribute the coating on the lens. The coated lens was then dried in a convection oven at 100° C. for 30 minutes to desolvate and solidify the coating. The lens was air cooled to ambient temperature for 10 minutes. The photochromic coated lens was then washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

Example 25

Example 25 was prepared similarly to Example 24, except photochromic coating of Example 12 was replaced with the photochromic coating of Example 13.

Example 26

Example 26 was prepared similarly to Example 24, except photochromic coating of Example 12 was replaced with the photochromic coating of Example 16.

Example 27

Example 27 was prepared similarly to Example 24, except photochromic coating of Example 12 was replaced with the photochromic coating of Example 17.

Example 28

One lens substrate each of CR-39, PC, MR-7, MR-8, MR-10 and MR-174 was chemically etched with 10% aqueous sodium hydroxide solution at 60° C. for 10 minutes, rinsed sequentially with city and DI water, and dried with compressed air. Each of the cleaned lenses was coated as follows:

The lens was mounted on a suction cup and placed in a manual spin coater. 1.5 ml of PDR153X2 primer was dispensed on the geometric center of the lens via a pipette while spinning the lens at 600 rpm for 5 seconds. The dispensing was then discontinued and the lens spun at 2000 rpm for 20 s to evenly distribute and spin-dry the primer. The spin speed was then reduced to 600 rpm and 1.5 ml of the photochromic coating of Example 14 was dispensed on the geometric center of the lens via a pipette while spinning the lens at 600 rpm for 5 seconds. The dispensing was then discontinued and the lens was spun at a speed of 1000 rpm for 20 s seconds to evenly distribute the coating on the lens. The coated lens was then dried at 100° C. for 30 minutes in a convection oven to desolvate and solidify the coating. The lens was air cooled to ambient temperature for 10 minutes. The photochromic coated lens was then washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

Example 29

Example 29 was prepared similarly to Example 24, except photochromic coating of Example 12 was replaced with the photochromic coating of Example 15.

Example 30

PR1165 primer and the photochromic coating of Example 12 were each diluted with PM glycol ether to a solids level suitable for spray coating. A MR-8 lens substrate was cleaned by wiping with a lint-free microfiber wipe pre-soaked in isopropyl alcohol, dried with compressed air and mounted on a turntable. The diluted primer was applied to the lens substrate as a fine mist using a Sono-tek Accumist Spray system, while rotating the lens to achieve a uniform coating layer, and then dried in ambient air for 15 minutes. The diluted photochromic coating of Example 12 was applied to the lens substrate as a fine mist using a Sono-tek Accumist Spray system, while rotating the lens to achieve a uniform coating layer. The flow rate through the spray nozzle, and turntable speed were adjusted to achieve a photochromic coating thickness of from 7 to 8 micrometer after drying the spray coated lens at 100° C. for 30 minutes to desolvate and solidify the coating. The lens was air cooled to ambient temperature for 10 minutes. The photochromic coated lens was then washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

The physical properties of the coated lenses of Configuration E and their photochromic performance on exposure to direct sunlight are listed in Table 7.

TABLE 7

Performance of Configuration E - Examples 24-30

|  | Example 24 | | Example 25 | | Example 26 | |
|---|---|---|---|---|---|---|
| Substrate | CR-39 | MR-8 | CR-39 | MR-8 | CR-39 | MR-8 |
| Adhesion Promoter 1 Thickness (um) | 0.2 | 0.2 | 0.2 | 0.2 | 0.2 | 0.2 |
| Photochromic Coating Thickness (um) | 5.5 | 5.5 | 5.5 | 5.5 | 5.5 | 5.5 |
| Protective Hard Coating Thickness (um) | 2.7-2.8 | 2.7-2.8 | 2.7-2.8 | 2.7-2.8 | 2.7-2.8 | 2.7-2.8 |
| Appearance | Pass | Pass | Pass | Pass | Pass | Pass |
| Haze (%) | 0.19 | 0.20 | 0.36 | 0.25 | 0.28 | 0.33 |
| Cross-Hatch Adhesion % | 99 | 99 | 98 | 98 | 98 | 98 |
| Bayer Ratio | 3.9 | | 3.9 | | 3.9 | |
| UV Source: Direct Sunlight | | | | | | |
| $T_0$ | 90.8% | 90.4% | 90.9% | 90.4% | 90.8% | 90.2% |
| Darkening Rate | | | | | | |
| $t\_d_{50}$ | 10 s | 15 s | 10 s | 10 s | 10 s | 10 s |
| $T_m$ | 20% | 20.6% | 20.3% | 20.7% | 21.1% | 22.2% |
| Fading Rate | | | | | | |
| $t\_f_{70}$ | 80 s | 120 s | 70 s | 90 s | 80 s | 90 s |

|  | Example 27 | | Example 28 | | | | | |
|---|---|---|---|---|---|---|---|---|
| Substrate | CR-39 | MR-8 | CR-39 | PC | MR-8 | MR-7 | MR-10 | MR-174 |
| Adhesion Promoter 1 Thickness (um) | 0.2 | 0.2 | 0.2 | 0.2 | 0.2 | 0.2 | 0.2 | 0.2 |
| Photochromic Coating Thickness (um) | 5.5 | 5.5 | 7.09 | 7.03 | 7.08 | 7.04 | 7.17 | 7.08 |
| Protective Hard Coating Thickness (um) | 2.7-2.8 | 2.7-2.8 | 2.76 | 2.72 | 2.70 | 2.81 | 2.96 | 2.74 |
| Appearance | Pass | Pass | Pass | Pass | Pass | Pass | Pass | Pass |
| Haze (%) | 0.21 | 0.24 | 0.11 | 0.17 | 0.14 | 0.09 | 0.12 | 1.18 |
| Cross-Hatch Adhesion % | 98 | 95 | 99 | 99 | 100 | 100 | 99 | 100 |
| Bayer Ratio | 3.9 | | 4.2 | | | | | |
| UV Source: Direct Sunlight | | | | | | | | |
| $T_0$ | 90.8% | 90.4% | 91.1% | 87.1% | 90.8% | 90.1% | 90.0% | 87.9% |
| Darkening Rate | | | | | | | | |
| $t\_d_{50}$ | 10 s | 15 s | 10 s | 15 s | 10 s | 10 s | 10 s | 10 s |
| $T_m$ | 21.6% | 22.9% | 18.9% | 23.6% | 21.0% | 20.6% | 20.7% | 20.1% |
| Fading Rate | | | | | | | | |
| $t\_f_{70}$ | 70 s | 100 s | 110 s | 110 s | 100 s | 100 s | 90 s | 100 s |

|  | Example 29 | | Example 30 |
|---|---|---|---|
| Substrate | CR-39 | MR-8 | MR-8 |
| Adhesion Promoter 1 Thickness (um) | 0.2 | 0.2 | 0.2 |
| Photochromic Coating Thickness (um) | 6.3 | 6.3 | 7.5 |
| Protective Hard Coating Thickness (um) | 2.87 | 3.26 | 2.7-2.8 |
| Appearance | Pass | Pass | Pass |
| Haze (%) | 0.19 | 0.14 | 0.07 |
| Cross-Hatch Adhesion % | 98 | 99 | 99 |
| Bayer Ratio | 3.8 | | |

TABLE 7-continued

Performance of Configuration E - Examples 24-30

UV Source: Direct Sunlight

| | | | |
|---|---|---|---|
| $T_0$ Darkening Rate | 91.6% | 91.3% | 89.1% |
| $t\_d_{50}$ | 10 s | 15 s | 10 s |
| $T_m$ Fading Rate | 23.8% | 26.5% | 23.5% |
| $t\_f_{70}$ | 110 s | 90 s | 80 s |

In addition, coated MR-8 lenses from Examples 24-29 were tested for photochromic performance using a Xenon arc lamp UV source. These results are presented in Table 8.

TABLE 8

Performance of Configuration E - Examples 24-29

| | Example 24 | Example 25 | Example 26 | Example 27 | Example 28 | Example 29 |
|---|---|---|---|---|---|---|
| Substrate | MR-8 | MR-8 | MR-8 | MR-8 | MR-8 | MR-8 |
| Adhesion Promoter 1 Thickness (um) | 0.2 | 0.2 | 0.2 | 0.2 | 0.2 | 0.2 |
| Photochromic Coating Thickness (um) | 5.5 | 5.5 | 5.5 | 5.5 | 5.5 | 5.5 |
| Protective Hard Coating Thickness (um) | 2.7-2.8 | 2.7-2.8 | 2.7-2.8 | 2.7-2.8 | 2.7-2.8 | 2.7-2.8 |
| Appearance | Pass | Pass | Pass | Pass | Pass | Pass |
| Haze (%) | 0.20 | 0.25 | 0.33 | 0.24 | 0.10 | 0.25 |
| Cross-Hatch Adhesion % | 99 | 98 | 98 | 95 | 98 | 98 |
| UV Source: Xenon Arc Lamp | | | | | | |
| $T_0$ Darkening Rate | 90.4% | 90.4% | 90.2% | 90.4% | 90.4% | 90.5% |
| $t\_d_{50}$ | 26 s | 25 s | 25 s | 25 s | 25 s | 43 s |
| $T_m$ Fading Rate | 22.9% | 22.6% | 22.5% | 22.4% | 22.1% | 27.5% |
| $t\_f_{70}$ | 193 s | 193 s | 188 s | 189 s | 193 s | 203 s |

3. Configuration G (from Table 1)

Example 31

A CR-39 and a MR-8 lens substrate were chemically etched with 10% aqueous sodium hydroxide solution at 60° C. for 10 minutes, rinsed sequentially with city and DI water, and dried with compressed air. Each of the cleaned lenses was dip-coated as follows:

The clean substrate was first dip-coated into PDR153X2 primer at a withdrawal rate of 1.5 mm/s and dried at room temperature for 10 min. The primed lens was then dip-coated into the photochromic coating of Example 18 at a withdrawal rate of 1.5 mm/s followed by desolvation in a convection oven at 100° C. for 30 minutes. After cooling to ambient temperature, the photochromic coated lens was washed with 10% Simple Green detergent in DI water, thoroughly rinsed with DI water, and dried with compressed air. The photochromic coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

The physical properties of the coated lenses of Configuration G and their photochromic performance on exposure to direct sunlight are listed in Table 9.

TABLE 9

Performance of Configuration G - Example 31

| | Example 31 | |
|---|---|---|
| Substrate | CR-39 | MR-8 |
| Adhesion Promoter 1 Thickness (um) | 0.2 | 0.2 |
| Photochromic Coating Thickness (um) | 5.5 | 5.5 |
| Protective Hard Coating Thickness (um) | 2.7-2.8 | 2.7-2.8 |
| Appearance | Pass | Pass |
| Haze (%) | 0.31 | 0.21 |
| Cross-Hatch Adhesion % | 99 | 99 |
| UV Source: Direct Sunlight | | |
| Bayer Ratio | 4.0 | |
| $T_0$ Darkening Rate | 89.9% | 89.1% |
| $t\_d_{50}$ | 10 s | 10 s |
| $T_m$ | 17.6% | 21.3% |

TABLE 9-continued

Performance of Configuration G - Example 31

| | Example 31 | |
|---|---|---|
| Fading Rate | | |
| $t\_f_{70}$ | 80 s | 80 s |

4. Configuration K (from Table 1)

Example 32

A MR-8 lens substrate was chemically etched with 10% aqueous sodium hydroxide solution at 60° C. for 10 minutes, rinsed sequentially with city and DI water, and dried with compressed air. The lens was mounted on a suction cup and placed in a manual spin coater. 1.5 ml of PDR153X2 primer (Adhesion Promoter 1) was dispensed on the geometric center of the lens via a pipette while spinning the lens at 600 rpm for 5 seconds. The dispensing was then discontinued and the lens spun at 2000 rpm for 20 s to evenly distribute and spin-dry the primer. The spin speed was reduced to 600 rpm and 1.5 ml of the photochromic coating of Example 12 was dispensed on the geometric center of the lens via a pipette while spinning the lens at 600 rpm for 5 seconds. The dispensing was then discontinued and the lens was spun at a speed of 1000 rpm for 20 s seconds to evenly distribute the coating on the lens. The spin-coated lens was then dried at 100° C. for 30 minutes in a convection oven to desolvate and solidify the coating. The lens was air cooled to ambient temperature for 10 minutes. The photochromic coated lens was then washed with 10% Simple Green detergent in DI water, thoroughly rinsed with DI water, and dried with compressed air. The photochromic coated lens was mounted on a suction cup and placed in a manual spin coater. 1.5 ml of the coating of Example 19 (Adhesion Promoter 2) was dispensed on the geometric center of the lens via a pipette while spinning the lens at 400 rpm for 5 seconds. The dispensing was then discontinued and the lens was spun at a speed of 1000 rpm for 20 seconds to evenly distribute and spin-dry the coating. The coated lens was dip coated with MP1179 protective hard coating at a withdrawal speed of ~1.3 mm/s and 10 s dwell time to yield a protective coating thickness of 2.6-2.8 um after thermal cure at 110° C. for 3 hours.

The physical properties of the coated lens of Configuration K and its photochromic performance on exposure to direct sunlight are listed in Table 10.

TABLE 10

Performance of Configuration K - Example 32

| | Example 32 |
|---|---|
| Substrate | MR-8 |
| Adhesion Promoter 1 Thickness (um) | 0.2 |
| Photochromic Coating Thickness (um) | 5.5 |
| Adhesion Promoter 2 Thickness (um) | 0.5 |
| Protective Hard Coating Thickness (um) | 2.7-2.8 |
| Appearance | Pass |
| Haze (%) | 0.12 |
| Cross-Hatch Adhesion % | 99 |

TABLE 10-continued

Performance of Configuration K - Example 32

| | Example 32 |
|---|---|
| UV Source: Direct Sunlight | |
| $T_0$ | 90.3% |
| Darkening Rate | |
| $t\_d_{50}$ | 10 s |
| $T_m$ | 24.8% |
| Fading Rate | |
| $t\_f_{70}$ | 70 s |

5. Configuration G (from Table 1)

Example 33

MR-8 lens substrates were chemically etched with 10% aqueous sodium hydroxide solution at 50° C. for 10 minutes, rinsed sequentially with city and DI water, and dried with compressed air. The cleaned lens was coated as follows:

The cleaned MR8 lens was dip coated with PDR153X2 primer coating at a withdrawal speed of ~1.5 mm/s and 10 seconds dwell time to yield a primer layer after air dry for 5 minutes followed by 10 minutes oven dry at 70° C. The primed lens was cooled down to ambient temperature prior to dip-coated into the photochromic coating of Example 20 at a withdrawal rate of 1.2 mm/s. The lens was pre-dried at 70° C. for 10 minutes followed by desolvation in a convection oven at 100° C. for 30 minutes yielding photochromic layer thickness of 5.5-6.5 µm. The photochromic coated lens was dip coated with HARDCOAT 1 protective hard coating at a withdrawal speed of ~2.0 mm/s and 10 seconds dwell time to yield a protective coating thickness of 2.6-2.8 µm after thermal cure at 110° C. for 3 hours.

TABLE 11

Performance of Configuration G - Example 33

| | Example 33 |
|---|---|
| Substrate | MR-8 |
| Adhesion Promoter 1 Thickness (um) | 0.4 |
| Photochromic Coating Thickness (um) | 6.5 |
| Protective Hard Coating Thickness (um) | 2.8-2.9 |
| Appearance | Pass |
| Haze (%) | 0.29 |
| Cross-Hatch Adhesion % | 100 |
| UV Source: Direct Sunlight | |
| $T_0$ | 88.4% |
| Darkening Rate | |
| $t\_d_{50}$ | 11 s |
| $T_m$ | 19.5% |
| Fading Rate | |
| $t\_f_{70}$ | 110 s |

6. Configuration C (from Table 1)

Example 34

MR8 plastic lens substrates were treated with a surface treatment solution, a mix of 25 parts of DYNASYLAN HYDROSIL 1151 amino-functional silane and 75 parts water, in an ultrasonic bath for 5 minutes at 50° C., rinsed sequentially with city water, deconex OP171 detergent solution available from Borer Chemie, DI water, and dried with compressed air.

The surfaced treated MR8 lenses were dip coated with the photochromic coating of Example 21 at a withdrawal rate of 1.2 mm/s at 20° C. The lens was pre-dried at 70° C. for 10 minutes followed by desolvation in a convection oven at 100° C. for 30 minutes yielding photochromic layer thickness of 5.5-7.0 μm. The photochromic coated lens was dip coated with HARDCOAT 1 protective hard coating at a withdrawal speed of ~2.0 mm/s and 10 seconds dwell time to yield a protective coating thickness of 2.6-2.8 μm after thermal cure at 110° C. for 3 hours.

TABLE 12

Performance of Configuration C - Example 34

| | Example 34 |
|---|---|
| Substrate | MR-8 |
| Photochromic Coating Thickness (um) | 6.9 |
| Protective Hard Coating Thickness (um) | 2.8-2.9 |
| Appearance | Pass |
| Haze (%) | 0.29 |
| Cross-Hatch Adhesion % | 100 |
| UV Source: Direct Sunlight | |
| $T_0$ | 85.7% |
| Darkening Rate | |
| $t\_d_{50}$ | 10 s |
| $T_m$ | 20.6% |
| Fading Rate | |
| $t\_f_{70}$ | 85 s |

All of the photochromic assemblies presented in Tables 6 through 12 exhibit desired cosmetic appearance and photochromic response.

Other than in the operating examples, or where otherwise indicated, all values, such as those expressing wavelengths, quantities of ingredients, ranges or reaction conditions, used in this description and the accompanying claims are to be understood as modified in all instances by the term "about". Unless otherwise indicated, all coating component weight percentages disclosed herein are based on the total weight of the coating composition.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the disclosure, in its broader aspects, is not limited to the specific details and illustrative examples shown and described. Accordingly, departures may be made from such details without departing from the spirit or scope of the applicant's general disclosure herein.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B), it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

As used in the description of the invention and the appended claims, the singular forms "a," "an," and "the" are intended to include the plural forms as well, unless the context clearly indicates otherwise.

The coating compositions and corresponding methods or processes may comprise, consist of, or consist essentially of the essential elements, steps and limitations described herein, as well as any additional or optional ingredients, components, steps, or limitations described herein or otherwise useful in coating composition applications.

Unless otherwise indicated, all references, literature, patents, and patent applications identified herein are incorporated by reference in their respective entireties.

We claim:

1. A photochromic article comprising:
    a) a substrate;
    b) a thermoplastic photochromic coating composition solidified on at least one surface of the substrate to form a photochromic coating, the photochromic coating composition comprising
        i) a thermoplastic acrylic copolymer wherein the copolymer or at least one segment of the copolymer has a Tg below 55° C., wherein the copolymer is an ABA triblock copolymer and A is poly(methyl methacrylate-co-dialkylacrylamide) and B is poly(butyl acrylate);
        ii) one or more photochromic compounds; and
        iii) a non-reactive organic solvent;
        wherein the total amount of photochromic compound(s) is at least 40 parts by weight per 100 parts by weight of the total amount of thermoplastic acrylic copolymer in the coating composition, wherein the photochromic coating has a thickness of from 3 to 20 micrometers;
    c) an optional first organic adhesion promoter layer interposed between the substrate and the photochromic coating;
    d) a protective polymeric hard coating superposed over the photochromic coating; and
    e) an optional second organic adhesion promoter layer interposed between the photochromic coating and the protective hard coating.

2. The article of claim 1 wherein A contains 1 to 40 mole percent dialkylacrylamide.

3. The article of claim 2 wherein the dialkylacrylamide is N,N-dimethacrylamide.

4. The article of claim 1 wherein the photochromic coating composition comprises 5 to 65 weight percent of the thermoplastic acrylic copolymer.

5. The article of claim 1 wherein the organic solvent in the photochromic coating composition is one or a mixture of solvents selected from aliphatic alcohols, alcohol esters, glycol ether esters, alcohol ethers, ketones, and alcohol ketones.

6. The article of claim 1 wherein the photochromic coating composition includes from 2 to 30 weight percent of the one or more photochromic compounds.

7. The article of claim 1 wherein the total amount of the one or more photochromic compounds is at least 50 parts by weight per 100 parts by weight of the total weight of thermoplastic acrylic copolymer.

8. The article of claim 1 wherein the one or more photochromic compounds are selected from benzopyrans, naphthopyrans, phenanthropyrans, quinopyrans, indeno-fused naphthopyrans, benzoxazines, naphthoxazines, spiro (indoline)pyridobenzoxazines, metal-dithizonate, fulgides, fulgimides, derivatives thereof, and mixtures thereof.

9. The article of claim 1 wherein the protective polymeric hard coating is a thermally curable organosilane coating.

10. The article of claim 1 wherein said substrate comprises paper, glass, ceramic, wood, masonry, textile, metal, or polymeric organic material.

11. The article of claim 10 wherein the polymeric organic material is a solid transparent polymer selected from poly (methyl methacrylate); poly(ethylene glycol bismethacrylate); poly(ethoxylated bisphenol A dimethacrylate); thermoplastic polycarbonate; poly(vinyl acetate); polyvinylbutyral; polyurethane; polythiourethanes; polysulfides; polymers formed from one or more monomers selected from diethylene glycol bis(allyl carbonate) monomers, diethylene glycol dimethacrylate monomers, ethoxylated phenol methacrylate monomers, diisopropenyl benzene monomers, ethoxylated trimethylol propane triacrylate monomers; and mixtures thereof.

12. The article of claim 11 wherein the article exhibits a Bayer Abrasion ratio of at least 2.

13. The article of claim 11 wherein the article exhibits a darkening time as defined by $td_{50}$ of 60 seconds or less, and a fading time as defined by $tf_{70}$ of less than 300 seconds; wherein:

$td_{50}$ is the time to darken from $T_0$ to $T_{50}$ during UV exposure, $tf_{70}$ is the time to fade from $T_m$ to $T_{70}$ after removal of UV exposure, $T_0$ is initial % light transmittance before UV exposure, $T_m$ is the minimum % light transmittance after 15 minutes of UV exposure, $T_{50}=0.5*T_0$, $T_{70}=0.7*T_0$ and UV exposure is from direct sunlight and/or Xenon arc lamp according to ISO/DIS 8980-3 standard at an ambient temperature of 23±2° C.

14. The article of claim 1 wherein said article is a lens.

15. The article of claim 14 wherein the refractive index of said lens is from 1.48 to 1.80.

16. A method for preparing a photochromic article comprising:
    a) applying and solidifying a thermoplastic photochromic coating composition on at least one surface of a substrate to form a thermoplastic photochromic coating, the photochromic coating composition comprising
        i) a thermoplastic acrylic copolymer wherein the copolymer or at least one copolymer segment has a Tg below 55° C., wherein the copolymer is an ABA triblock copolymer and A is a poly(methyl methacrylate-co-dialkylacrylamide) and B is a poly(butyl acrylate);
        ii) one or more photochromic compounds; and
        iii) a non-reactive organic solvent;
        wherein the total amount of photochromic compound (s) is at least 40 parts by weight per 100 parts by weight of the total amount of thermoplastic acrylic copolymer in the coating composition, wherein the thermoplastic photochromic coating has a thickness of from 3 to 20 micrometers;
    b) optionally applying and solidifying a first organic adhesion promoter layer on the at least one surface of the substrate prior to applying the photochromic coating such that the first organic adhesion promoter layer is interposed between the substrate and the photochromic coating;
    c) applying and solidifying a protective polymeric hard coating superposed over the photochromic coating; and
    d) optionally applying and solidifying a second organic adhesion promoter layer on the photochromic coating prior to applying the protective polymeric hard coating such that the second organic adhesion promoter layer is interposed between the photochromic coating and the protective hard coating.

* * * * *